United States Patent
Toyama

(10) Patent No.: US 7,221,511 B2
(45) Date of Patent: May 22, 2007

(54) VIBRATION-PROOF ZOOM LENS AND CAMERA PROVIDED WITH THE SAME

(75) Inventor: Nobuaki Toyama, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/476,078

(22) Filed: Jun. 28, 2006

(65) Prior Publication Data

US 2007/0002443 A1    Jan. 4, 2007

(30) Foreign Application Priority Data

Jun. 29, 2005   (JP)   ............................. 2005-190414

(51) Int. Cl.
*G02B 27/64*    (2006.01)
*G02B 15/14*    (2006.01)

(52) U.S. Cl. .................. 359/557; 359/554; 359/676; 359/684

(58) Field of Classification Search ........ 359/554–557, 359/676–692
See application file for complete search history.

(56) References Cited

U.S. PATENT DOCUMENTS

| 4,501,475 A * | 2/1985 | Fujita et al. .................. 359/683 |
| 5,502,594 A * | 3/1996 | Suzuki et al. ................ 359/557 |
| 5,654,826 A * | 8/1997 | Suzuki ........................ 359/557 |
| 5,678,071 A * | 10/1997 | Ohtake ........................ 396/55 |
| 5,694,252 A * | 12/1997 | Yahagi ........................ 359/684 |
| 5,731,897 A * | 3/1998 | Suzuki ........................ 359/557 |
| 5,771,123 A | 6/1998 | Hamano et al. |
| 6,392,816 B1 * | 5/2002 | Hamano ...................... 359/683 |
| 6,606,194 B2 * | 8/2003 | Hamano et al. ............. 359/557 |
| 6,618,197 B1 * | 9/2003 | Hayakawa .................. 359/557 |
| 6,721,105 B2 * | 4/2004 | Ohtake et al. .............. 359/676 |
| 7,038,858 B2 * | 5/2006 | Ohashi ........................ 359/685 |

FOREIGN PATENT DOCUMENTS

| JP | 7-128619 A | 5/1995 |
| JP | 7-151967 A | 6/1995 |

* cited by examiner

*Primary Examiner*—Thong Q. Nguyen
(74) *Attorney, Agent, or Firm*—Birch, Stewart, Kolasch & Birch, LLP

(57) ABSTRACT

A vibration-proof zoom lens comprises a positive first lens group, a negative second lens group, a positive third lens group, a positive fourth lens group, and a positive fifth lens group, which are disposed in this order from a subject side. The second lens group moves toward an image side at a time when magnification changes from a wide-angle end to a telephoto end. The fourth lens group moves to correct variation of an image plane at the time of magnification change. The first, third and fifth lens groups are fixed. The third lens group is composed of first to third subgroups. When vibration occurs, the second subgroup is moved in a plane perpendicular to an optical axis to correct an image position so that an image blur is prevented.

11 Claims, 15 Drawing Sheets

WIDE-ANGLE END

TELEPHOTO END

FIG. 4
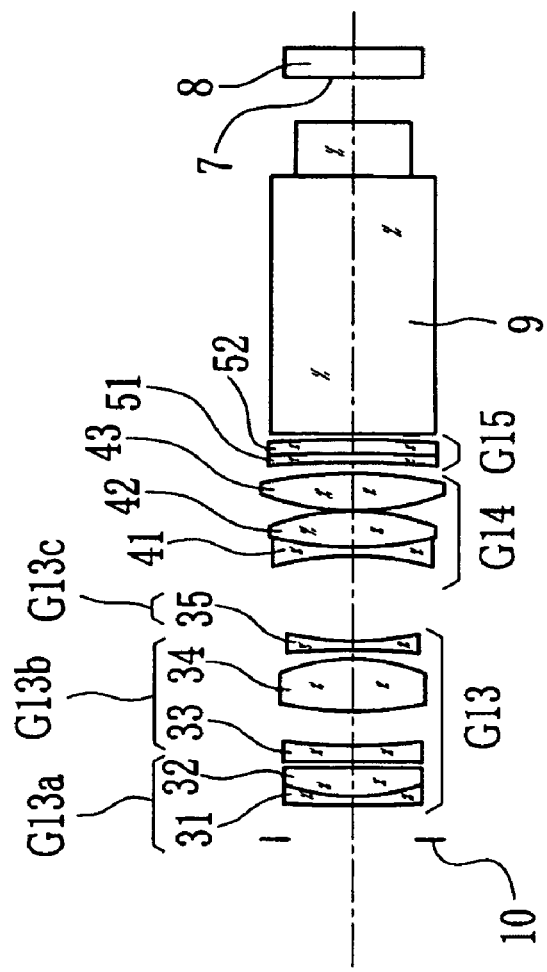
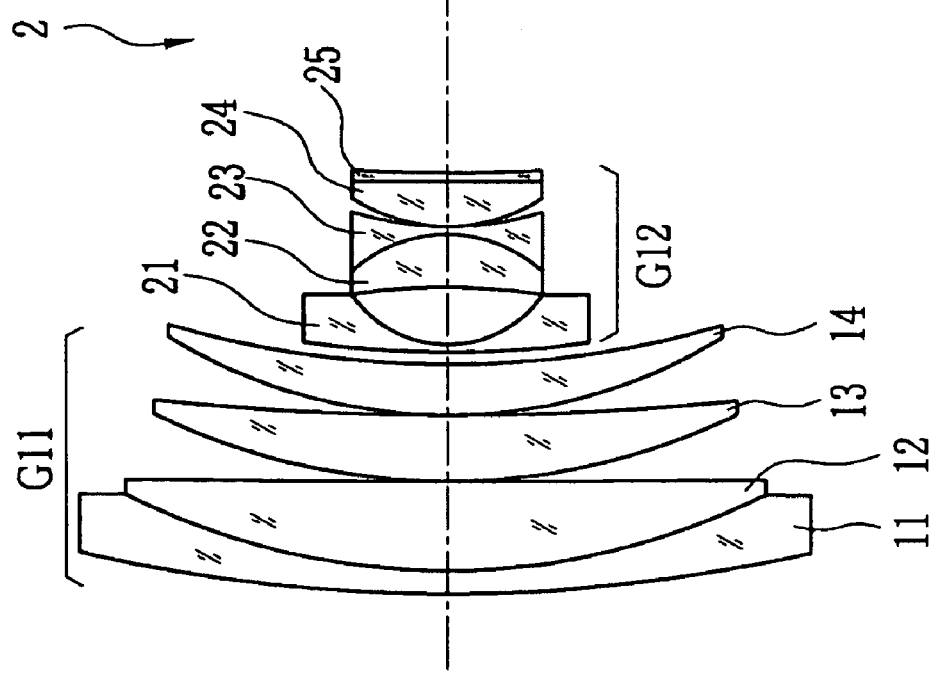

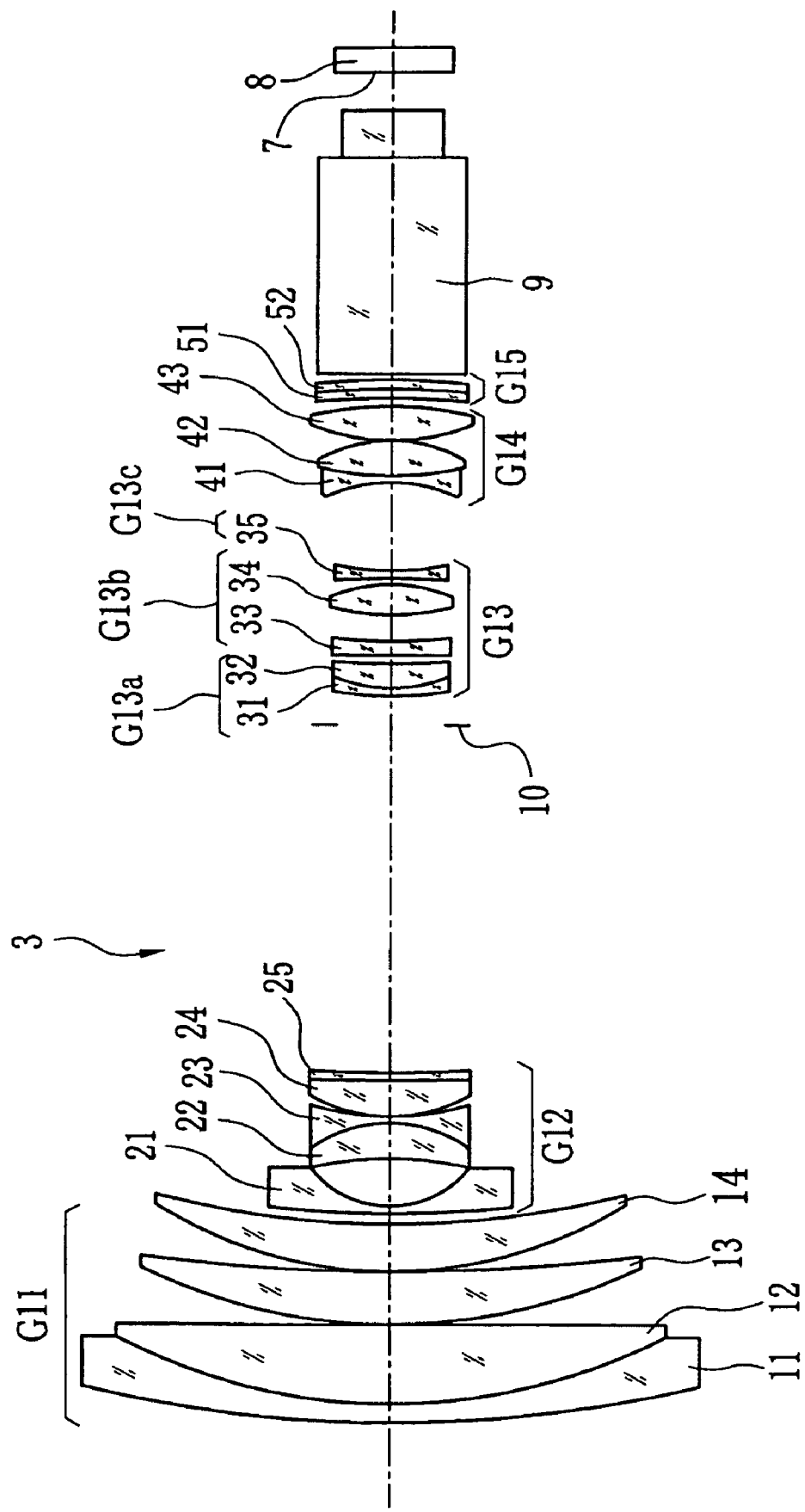

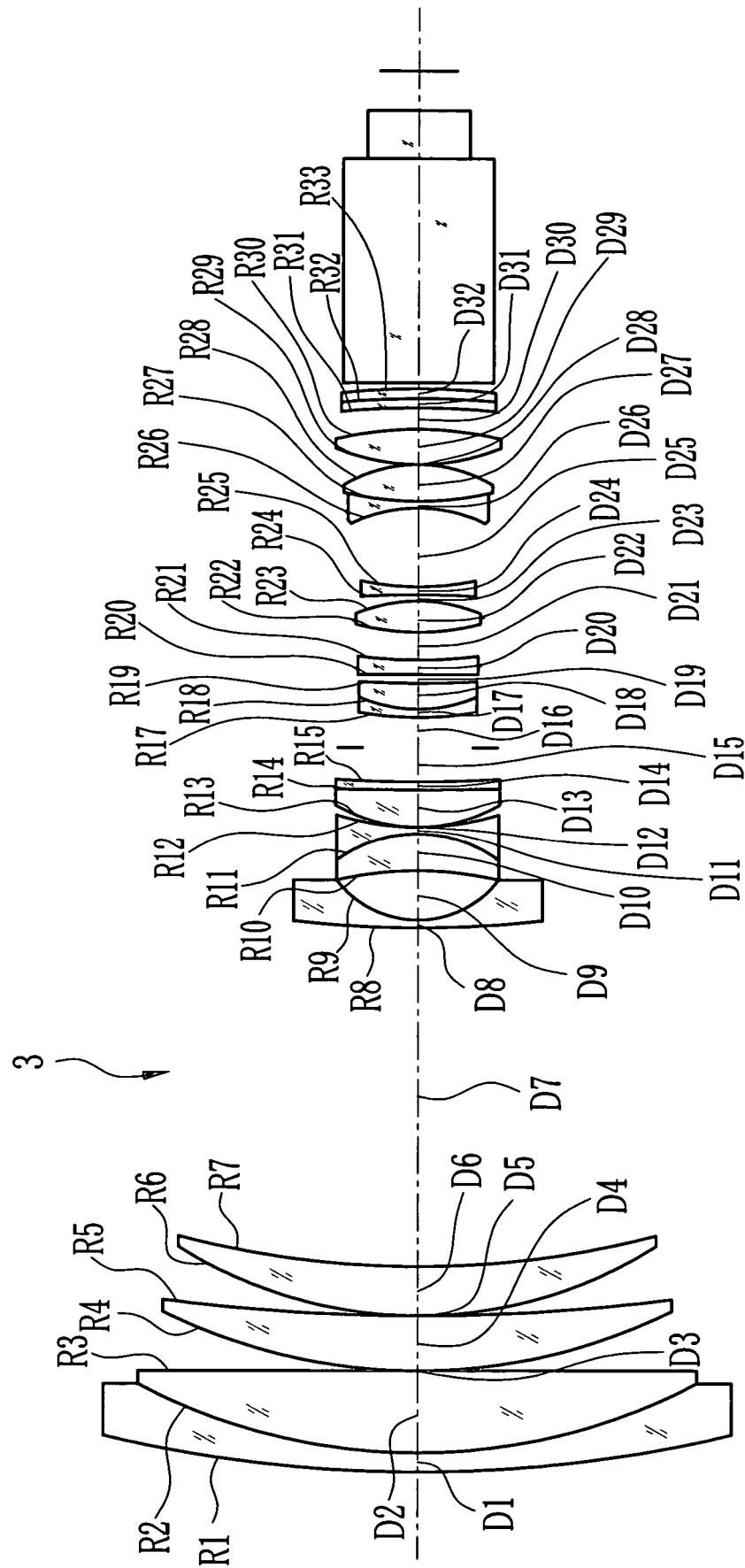

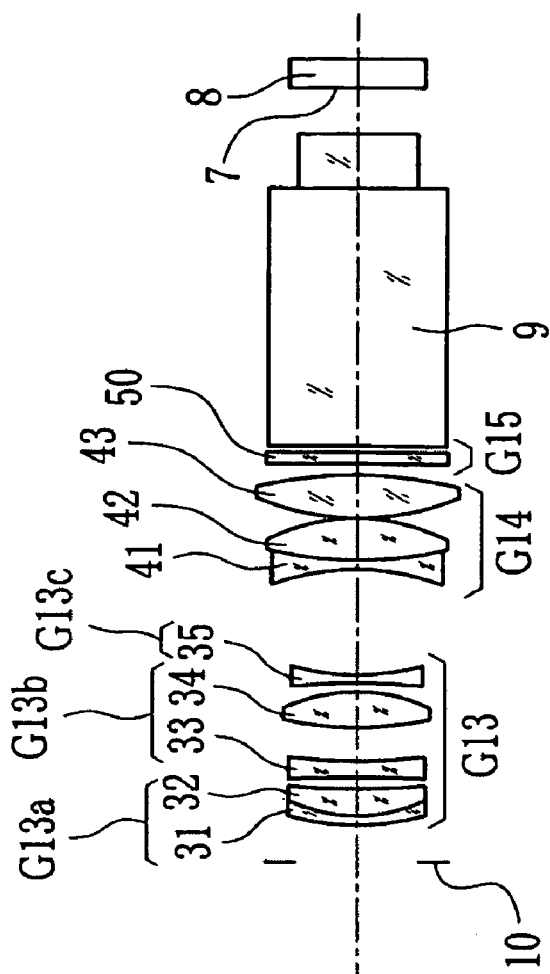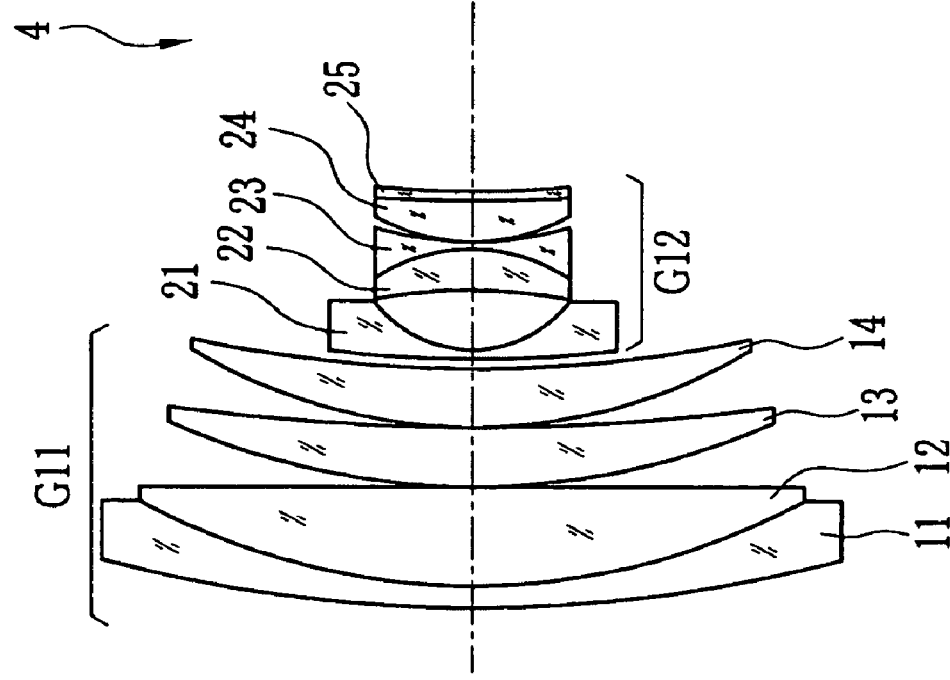
FIG. 10

WIDE-ANGLE END

F1.96 — SPHERICAL ABERRATION (-0.02 to 0.02)
35.1° — ASTIGMATISM (-0.02 to 0.02) — SAGITTAL, TANGENTIAL
35.1° — DISTORTION (-5% to 5%)

TELEPHOTO END

F2.85 — SPHERICAL ABERRATION (-0.02 to 0.02)
3.4° — ASTIGMATISM (-0.02 to 0.02) — SAGITTAL, TANGENTIAL
3.4° — DISTORTION (-5% to 5%)

VIBRATION-PROOF ZOOM LENS AND CAMERA PROVIDED WITH THE SAME

FIELD OF THE INVENTION

The present invention relates to a vibration-proof zoom lens and a camera provided with the same, which is suitable for an electronic camera of a broadcasting camera or the like, and to which a vibration-proof function is conferred to prevent an image from blurring due to camera shake.

BACKGROUND OF THE INVENTION

A zoom lens of a rear focus type is known (see Japanese Patent Laid-Open Publication No. 7-151967, which is a counterpart of Japanese Patent No. 3109342). This kind of the zoom lens has a five-group structure in which positive, negative, positive, positive and positive lens groups are disposed in this order from a subject side. The negative second lens group is moved toward an image side when magnification is changed from a wide-angle end to a telephoto end. The fourth lens group is moved to perform focusing and to correct image plane variation caused due to zooming. The first, third and fifth lens groups are securely fixed, so that the entire length of the lens groups is kept constant at the time of zooming and focusing. Moreover, a high zoom ratio of ten times is set and aberration fluctuation is restrained over the entire zoom range to achieve a high image-forming performance.

With respect to the zoom lens having a high zoom ratio, a blur of a shooting image is remarkably caused by camera shake and vibration of a vehicle or the like at a time of a telephoto operation. In view of this, a zoom lens having a vibration-proof function is known (see Japanese Patent Laid-Open Publication No. 7-128619, which is a counterpart of Japanese Patent No. 3359131). In this kind of the zoom lens, a certain lens is moved in a plane perpendicular to an optical axis when vibration occurs. By virtue of this, an image-forming position is moved in a direction perpendicular to the optical axis so that the blur of the shooting image is resolved.

The zoom lens described in the above-noted Publication No. 7-151967 is successful in preventing the aberration from fluctuating at the time of zooming. However, large eccentric aberration occurs when the certain lens is moved in the direction perpendicular to the optical axis. Thus, there is a problem in that the zoom lens of the Publication No. 7-151967 does not have a lens structure suitable for conferring the vibration-proof function.

SUMMARY OF THE INVENTION

In view of the foregoing, it is a primary object of the present invention to provide a vibration-proof zoom lens in which a zoom ratio is high.

It is a second object of the present invention to provide a vibration-proof zoom lens in which aberration is restrained from fluctuating at a time of zooming.

It is a third object of the present invention to provide a vibration-proof zoom lens in which it is possible to effectively relieve image blur to be caused by vibration.

In order to achieve the above and other objects, the vibration-proof zoom lens according to the present invention comprises a positive first lens group, a negative second lens group, a positive third lens group, a positive fourth lens group, and a positive fifth lens group, which are disposed in this order from a subject side. The second lens group moves along an optical axis of the zoom lens toward an image side to change magnification from a wide-angle end to a telephoto end. The fourth lens group moves along the optical axis to correct variation of an image plane, which is caused in accordance with the magnification change, and at the same time, to perform focusing. The first and fifth lens groups are fixed. The third lens group has at least three subgroups of a positive first subgroup, a positive second subgroup and a negative third subgroup. The second subgroup is moved in a plane perpendicular to the optical axis to correct an image blur when vibration occurs. The third lens group is provided with a lens structure suitable for performing a vibration-proof function.

The second subgroup of the third lens group includes a negative front group and a positive rear group, which are disposed in this order from the subject side. The negative front group has at least one aspheric surface, in virtue of which aberration is prevented from fluctuating at the time of vibration.

In a preferred embodiment, the subject-side surface of the negative front group is the aspherical surface whose concave power becomes stronger toward its periphery.

Moreover, each of the negative front group and the positive rear group is composed of a single lens. In this case, a structure for moving the lens in a direction perpendicular to the optical axis is simplified, and force required for moving the lens is small. Thus, the lens structure performs a practical vibration-proof function.

When L represents the entire length of the second subgroup of the third lens group along the optical axis, and when d represents an interval, which extends from the image-side surface of the negative front group to the subject-side surface of the positive rear group along the optical axis, the following expression is satisfied.

$$0.25 < d/L < 0.5$$

If d/L exceeds the upper limit of the above expression, the whole size is elongated since the lens interval becomes long. Further, a lens diameter of the second subgroup is enlarged. In contrast, if d/L exceeds the lower limit of the above expression, a movement amount of the image plane becomes small relative to a movement amount of the lens. Thus, it is impossible to perform the effective vibration-proof function.

The fourth lens group includes a negative lens having a concave facing toward the subject side, a positive lens having a convex facing toward the image side, and a biconvex positive lens. Either surface of the biconvex positive lens is an aspherical surface whose convex power becomes stronger toward its periphery. By virtue of this, fluctuation of aberration is restrained in both of long-distance shooting and short-distance shooting so that it is possible to obtain the vibration-proof zoom lens capable of performing excellent focus adjustment.

The second lens group comprises a negative meniscus lens, a cemented lens of a positive lens and a negative lens, a positive lens whose convex faces toward the subject side, and a negative lens, which are disposed in this order from the subject side. A concave of the negative meniscus lens faces toward the image side. The positive lens of the cemented lens has a convex facing toward the image side. By virtue of this, the vibration-proof zoom lens has excellent image-forming performance regarding resolution and contrast of the whole magnification range.

A camera of this invention comprises the above-mentioned vibration-proof zoom lens and an imaging device, which takes a subject image formed through the zoom lens. The imaging device outputs an image signal of the taken subject image. A clear shooting image is obtained by using the imaging device having high resolution.

According to the present invention, it is possible to obtain the high-performance vibration-proof zoom lens in which an angle of view is 70 degrees at the wide-angle end, and brightness of F1.9 and high zoom ratio of 11 times are achieved. Further, in this zoom lens, image quality is effectively prevented from deteriorating due to vibration, and aberration fluctuation is properly corrected at a magnification changing time and a focusing time.

BRIEF DESCRIPTION OF THE DRAWINGS

FIG. 4 is a section view of a second embodiment set to a wide-angle end;
FIG. 7 is a section view of a third embodiment set to a wide-angle end;
FIG. 8 is a section view of the third embodiment set to a telephoto end;
FIG. 10 is a section view of a fourth embodiment set to a wide-angle end.

DESCRIPTION OF THE PREFERRED EMBODIMENTS

Embodiment 1

Figure 1:
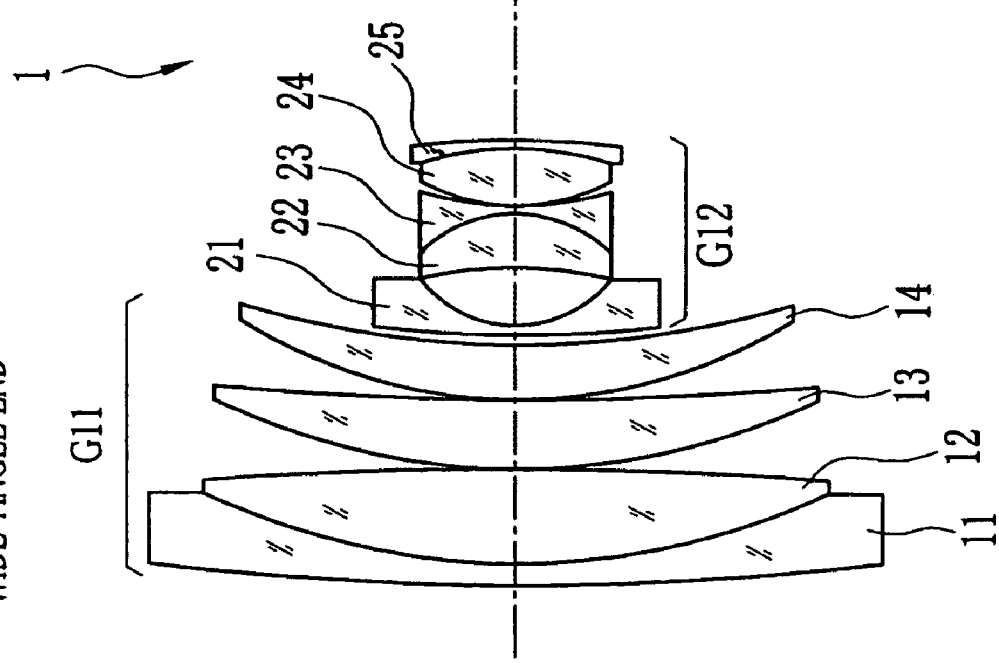
FIG. 1 is a section view of a first embodiment set to a wide-angle end.
Figure 2:
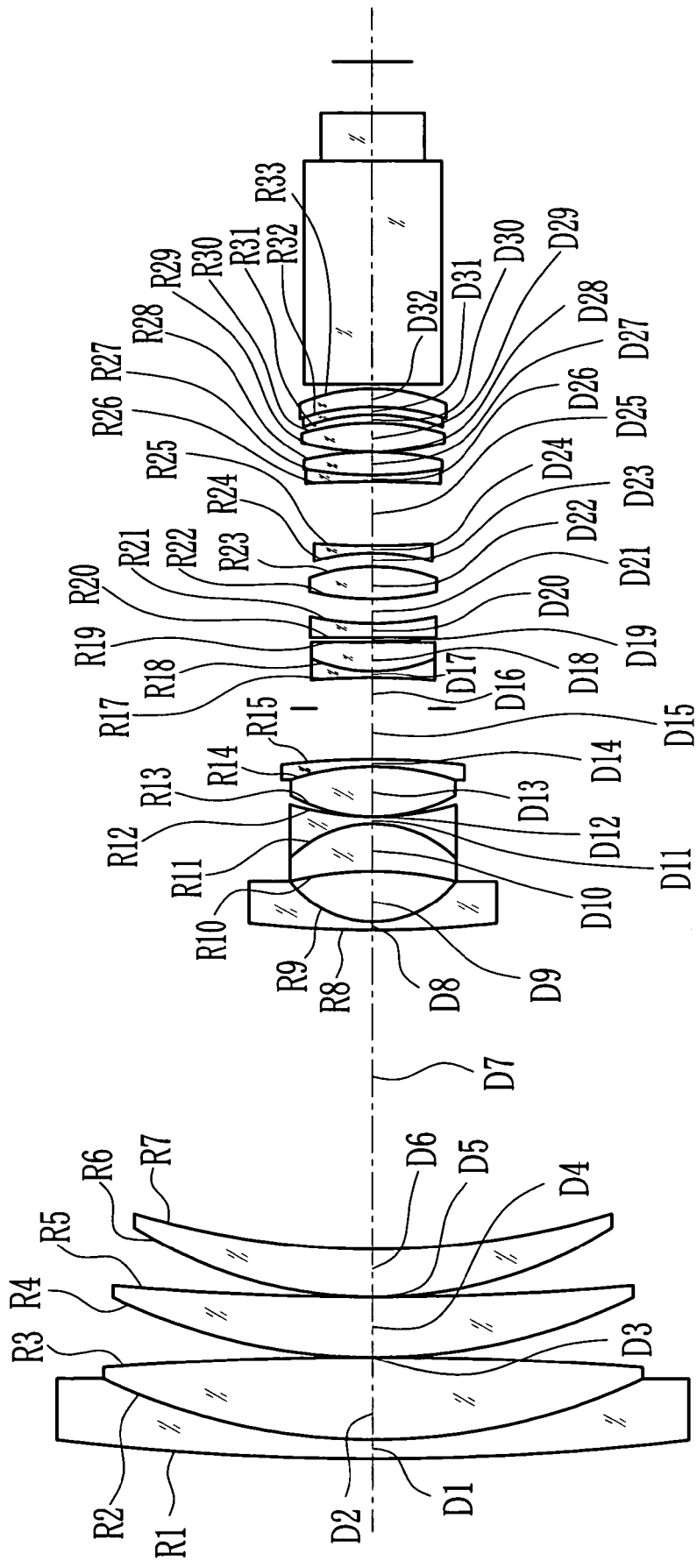
FIG. 2 is a section view of the first embodiment set to a telephoto end.

In FIGS. 1 and 2, a vibration-proof zoom lens 1 comprises a first lens group G11 having positive power, a second lens group G12 having negative power, a third lens group G13 having positive power, a fourth lens group G14 having positive power, and a fifth lens group G15 having positive power, which are disposed in this order from a subject side of the zoom lens 1. The second lens group G12 moves toward an image side of the zoom lens 1 when magnification is changed from a wide-angle end to a telephoto end. At this time, the fourth lens group G14 moves to correct variation of an image plane 7, on which an image of a subject is formed, in an optical-axis direction. The variation of the image plane is caused in accordance with the magnification change. Also, the fourth lens group G14 moves in the optical-axis direction to perform focus adjustment. The first, third and fifth lens groups G11, G13 and G15 are fixed and positions thereof are constant at any time including the magnification changing time and the focusing time. A stop 10 is disposed between the second and third lens groups G12 and G13. A color separation prism 9 for separating colors of incident light is disposed between the fifth lens group G15 and the image plane at which an imaging device 8 is disposed. The color separation prism 9 is represented as a plane parallel glass which is equivalent to an optical path length of the color separation prism. The imaging device takes a subject image and outputs an image signal of the taken image. Incidentally, other embodiments described later have a similar structure with the first embodiment, and description of the similar structure is omitted in the other embodiments. Lens data of the vibration-proof zoom lens 1 is shown in the following Tables 1A and 1B.

TABLE 1A

|  | Curvature Radius R | Surface Interval D | Refractive Index Ne | Abbe Number v d |
|---|---|---|---|---|
| 1 | 51.9958 | 0.335 | 1.855037 | 23.8 |
| 2 | 10.9145 | 1.492 | 1.498457 | 81.6 |
| 3 | −56.0362 | 0.017 |  |  |
| 4 | 10.4753 | 1.087 | 1.796374 | 48.7 |
| 5 | 57.3652 | 0.017 |  |  |
| 6 | 7.9823 | 0.838 | 1.778184 | 50.5 |
| 7 | 15.2459 | Variable |  |  |
| 8 | 21.8785 | 0.134 | 1.888140 | 40.8 |
| 9 | 1.8453 | 0.910 |  |  |
| 10 | −7.8014 | 0.841 | 1.858890 | 22.5 |
| 11 | −2.0364 | 0.136 | 1.793910 | 49.0 |
| 12 | 5.0171 | 0.017 |  |  |
| 13 | 3.0997 | 0.876 | 1.517040 | 52.3 |
| 14 | −4.7295 | 0.140 | 1.885095 | 40.0 |
| 15 | −11.8160 | Variable |  |  |
| 16 | Stop | 0.546 |  |  |
| 17 | −13.7727 | 0.134 | 1.540205 | 51.1 |
| 18 | 2.5654 | 0.522 | 1.858888 | 22.5 |
| 19 | −33.4774 | 0.084 |  |  |
| *20 | 30.8103 | 0.268 | 1.694165 | 31.1 |
| 21 | 5.6689 | 0.421 |  |  |
| 22 | 4.2238 | 0.561 | 1.501630 | 65.0 |
| 23 | −3.1531 | 0.250 |  |  |

TABLE 1B

|  | Curvature Radius R | Surface Interval D | Refractive Index Ne | Abbe Number v d |
|---|---|---|---|---|
| 24 | −3.6528 | 0.134 | 1.858879 | 22.5 |
| 25 | 12.5789 | Variable |  |  |
| 26 | −35.0351 | 0.135 | 1.796869 | 25.8 |
| 27 | 6.9329 | 0.400 | 1.651865 | 59.0 |
| 28 | −5.3959 | 0.017 |  |  |
| *29 | 4.9855 | 0.495 | 1.555713 | 62.9 |
| 30 | −4.2934 | Variable |  |  |
| 31 | −3.1364 | 0.134 | 1.886789 | 30.6 |
| 32 | −3.7372 | 0.322 | 1.885221 | 40.0 |
| 33 | −3.3216 | 0.084 |  |  |
| 34 | Infinity | 4.017 | 1.607181 | 38.0 |
| 35 | Infinity | 0.845 | 1.518250 | 64.1 |
| 36 | Infinity |  |  |  |

The first lens group G11 is composed of a meniscus negative lens 11, a biconvex positive lens 12 joined to the negative lens 11, and meniscus positive lenses 13 and 14, which are disposed in this order from the subject side. A concave of the negative lens 11 faces toward the image side. A convex of the respective positive lenses 13 and 14 faces toward the subject side. The second lens group G12 is composed of a meniscus negative lens 21, a meniscus positive lens 22, a biconvex negative lens 23 joined to the positive lens 22, a biconvex positive lens 24, and a meniscus negative lens 25 joined to the positive lens 24. A concave of the negative lens 21 faces toward the image side. A convex of the positive lens 22 faces toward the image side. A concave of the negative lens 25 faces toward the subject side.

The third lens group G13 is composed of a biconcave negative lens 31, a biconvex positive lens 32 joined to the negative lens 31, a meniscus negative lens 33, a biconvex positive lens 34, and a biconcave negative lens 35. The negative lens 33 has an aspherical surface facing toward the subject side and has a concave facing toward the image side. As to the aspherical surface of the negative lens 33, concave power thereof becomes stronger toward its periphery. To be precise, the third lens group G13 is composed of three subgroups G13$a$, G13$b$ and G13$c$. The first subgroup G13$a$ is a cemented lens of the negative lens 31 and the positive lens 32. The second subgroup G13$b$ comprises the negative lens 33 and the positive lens 34. The third subgroup G13$c$ comprises the negative lens 35. The second subgroup G13$b$ moves in a direction perpendicular to the optical axis to prevent an image from blurring due to vibration. A distance d extending between the concave of the negative lens 33, which faces toward the image side, and the convex of the positive lens 34, which faces toward the subject side, is longest in the third lens group G13. When the entire length of the second subgroup G13$b$ in the optical-axis direction is represented by L, d/L is as follows.

$$d/L = 0.421/1.250 = 0.3368$$

The fourth lens group G14 is composed of a biconcave negative lens 41, a biconvex positive lens 42 joined to the negative lens 41, and a biconvex positive lens 43 having an aspherical surface facing toward the subject side. Convex power of this aspherical surface becomes stronger toward the periphery thereof. The fifth lens group G15 is composed of a meniscus negative lens 51 and a meniscus positive lens 52 joined to the negative lens 51. A concave of the negative lens 51 faces toward the subject side and has high power. A convex of the positive lens 52 faces toward the image side and has high power. The aspherical surface (twentieth surface) of the negative lens 33, which faces toward the subject side, is represented by the following equation. The aspherical surface (twenty-ninth surface) of the positive lens 43, which faces toward the subject side, is also represented by the following equation. In the other embodiments, an aspherical surface of each lens is similarly represented by the following equation. Incidentally, aspherical surface coefficients of the respective aspherical surfaces are shown in the following Table 2.

TABLE 2

[Equation]

$$Z = \frac{\frac{1}{R} \cdot h^2}{1 + \sqrt{1 - K \cdot \left(\frac{1}{R}\right)^2 \cdot h^2}} + B3 \cdot h^3 + B4 \cdot h^4 + B5 \cdot h^5 + B6 \cdot h^6 + B7 \cdot h^7 +$$

$$B8 \cdot h^8 + B9 \cdot h^9 + B10 \cdot h^{10} + B11 \cdot h^{11} + B12 \cdot h^{12} + B13 \cdot h^{13} + B14 h^{14} +$$

$$B15 \cdot h^{16} + B16 \cdot h^{16} + B17 \cdot h^{17} + B18 \cdot h^{18} + B19 \cdot h^{19} + B20 \cdot h^{20}$$

|  | 20th Surface | 29th Surface |
|---|---|---|
| K | −6.127104424E+02 | 3.454077028E−01 |
| B3 | 8.864359979E−04 | −8.299570098E−04 |
| B4 | −7.182359564E−03 | −3.057684745E−03 |
| B5 | −9.369618262E−04 | −8.034111314E−04 |
| B6 | 2.236239791E−03 | −6.424884378E−05 |
| B7 | 6.225999140E−04 | 7.034160240E−05 |
| B8 | −2.985503169E−03 | 5.921923250E−05 |

TABLE 2-continued

[Equation]

$$Z = \frac{\frac{1}{R} \cdot h^2}{1 + \sqrt{1 - K \cdot \left(\frac{1}{R}\right)^2 \cdot h^2}} + B3 \cdot h^3 + B4 \cdot h^4 + B5 \cdot h^5 + B6 \cdot h^6 + B7 \cdot h^7 +$$

$$B8 \cdot h^8 + B9 \cdot h^9 + B10 \cdot h^{10} + B11 \cdot h^{11} + B12 \cdot h^{12} + B13 \cdot h^{13} + B14 h^{14} +$$

$$B15 \cdot h^{16} + B16 \cdot h^{16} + B17 \cdot h^{17} + B18 \cdot h^{18} + B19 \cdot h^{19} + B20 \cdot h^{20}$$

|  | 20th Surface | 29th Surface |
|---|---|---|
| B9 | −1.877205846E−03 | 2.423641751E−05 |
| B10 | −1.674203928E−04 | −4.899233968E−06 |
| B11 | −2.474784532E−04 | −2.088191304E−05 |
| B12 | 2.236456725E−03 | −2.381460632E−05 |
| B13 | 3.721788615E−03 | −1.871152898E−05 |
| B14 | −9.341461473E−04 | −8.722171808E−06 |
| B15 | −4.308790800E−03 | 9.809653061E−07 |
| B16 | 2.131074794E−03 | 8.479256214E−06 |
| B17 | −1.360750974E−03 | 1.104979025E−05 |
| B18 | 3.018975037E−03 | 9.046807969E−06 |
| B19 | −3.862950420E−03 | 2.083460367E−06 |
| B20 | 1.801826497E−03 | −8.433700594E−06 |

Figure 3A:
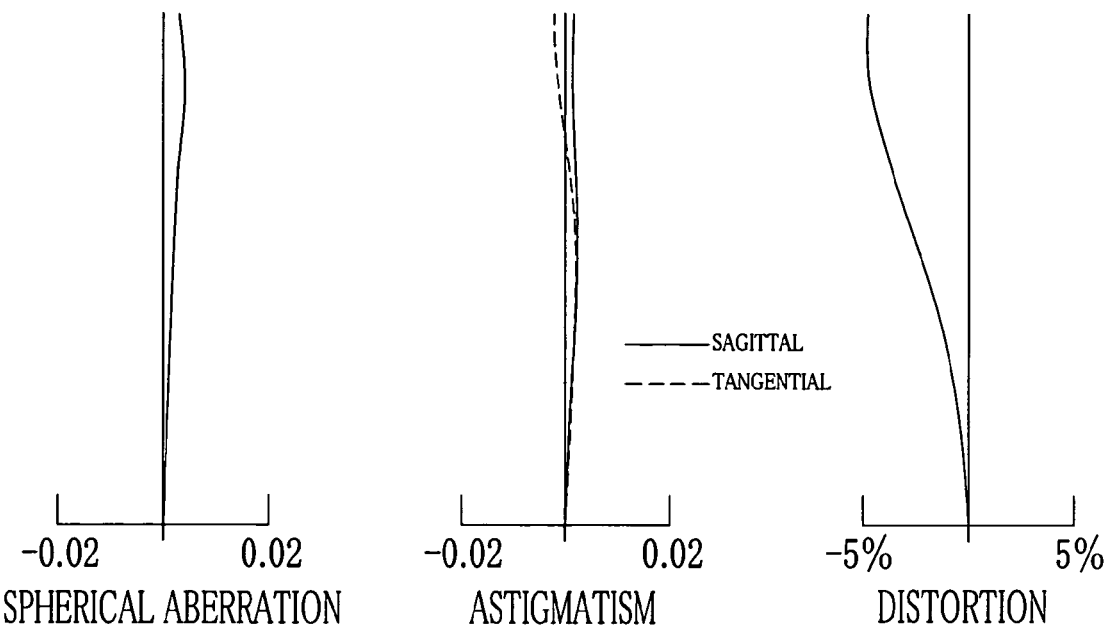
FIGS. 3A and 3B are charts showing aberration of the wide-angle and telephoto ends of the first embodiment.
Figure 3B:
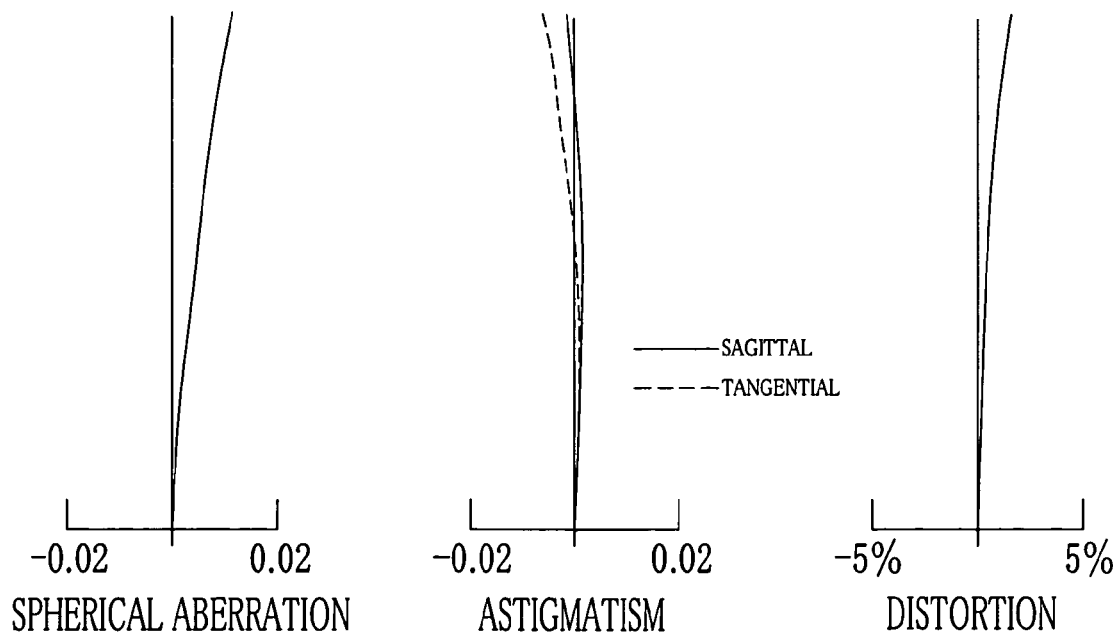

Composite focal length and f-number change in accordance with movement proceeding from the wide-angle end to the telephoto end. Anteroposterior lens intervals of each of the second and fourth lens groups G12 and G14 also change in accordance with the movement proceeding from the wide-angle end to the telephoto end. These changes are shown in the following Table 3. Meanwhile, FIGS. 3A and 3B are charts showing aberration concerning the wide-angle end and the telephoto end of the vibration-proof zoom lens 1.

TABLE 3

| F | 1.00 | 4.00 | 11.40 |
|---|---|---|---|
| f-number | 1.96 | 2.30 | 2.85 |
| D7 | 0.167 | 4.147 | 5.966 |
| D15 | 6.537 | 2.557 | 0.739 |
| D25 | 1.078 | 0.503 | 1.131 |
| D30 | 0.219 | 0.795 | 0.167 |

Embodiment 2

TABLE 4A

|  | Curvature Radius R | Surface Interval D | Refractive Index Ne | Abbe Number ν d |
|---|---|---|---|---|
| 1 | 26.4727 | 0.335 | 1.855037 | 23.8 |
| 2 | 10.2307 | 1.424 | 1.498457 | 81.6 |
| 3 | −1530.2308 | 0.017 |  |  |
| 4 | 10.2272 | 1.030 | 1.736002 | 54.7 |
| 5 | 51.3339 | 0.017 |  |  |
| 6 | 8.0231 | 0.791 | 1.732256 | 55.0 |
| 7 | 15.4617 | Variable |  |  |
| 8 | 16.3404 | 0.134 | 1.888140 | 40.8 |
| 9 | 1.7742 | 0.910 |  |  |
| 10 | −11.0784 | 0.818 | 1.858889 | 22.5 |
| 11 | −2.1135 | 0.136 | 1.819044 | 46.5 |
| 12 | 4.7781 | 0.017 |  |  |
| 13 | 2.8282 | 0.690 | 1.538331 | 48.3 |
| 14 | 1317.7836 | 0.136 | 1.885110 | 40.0 |
| 15 | 31.1205 | Variable |  |  |
| 16 | Stop | 0.550 |  |  |
| 17 | 19.1275 | 0.134 | 1.521412 | 59.2 |

TABLE 4A-continued

|  | Curvature Radius R | Surface Interval D | Refractive Index Ne | Abbe Number ν d |
|---|---|---|---|---|
| 18 | 3.1354 | 0.449 | 1.858327 | 22.5 |
| 19 | 113.9195 | 0.084 | | |

TABLE 4B

|  | Curvature Radius R | Surface Interval D | Refractive Index Ne | Abbe Number ν d |
|---|---|---|---|---|
| *20 | 65.5945 | 0.268 | 1.694165 | 31.1 |
| 21 | 7.6878 | 0.537 | | |
| 22 | 5.4965 | 0.831 | 1.500601 | 65.0 |
| 23 | −2.7872 | 0.142 | | |
| 24 | −10.0984 | 0.134 | 1.858745 | 22.5 |
| 25 | 4.4091 | Variable | | |
| 26 | −3.6873 | 0.134 | 1.604821 | 38.9 |
| 27 | 5.4894 | 0.537 | 1.501772 | 65.0 |
| 28 | −3.4981 | 0.017 | | |
| *29 | 3.6780 | 0.580 | 1.661556 | 58.6 |
| 30 | −6.1531 | Variable | | |
| 31 | −14.0934 | 0.134 | 1.854952 | 23.9 |
| 32 | −31.5205 | 0.223 | 1.888140 | 40.8 |
| 33 | −13.0429 | 0.084 | | |
| 34 | Infinity | 4.017 | 1.607181 | 38.0 |
| 35 | Infinity | 0.845 | 1.518250 | 64.1 |
| 36 | Infinity | | | |

Figure 5:
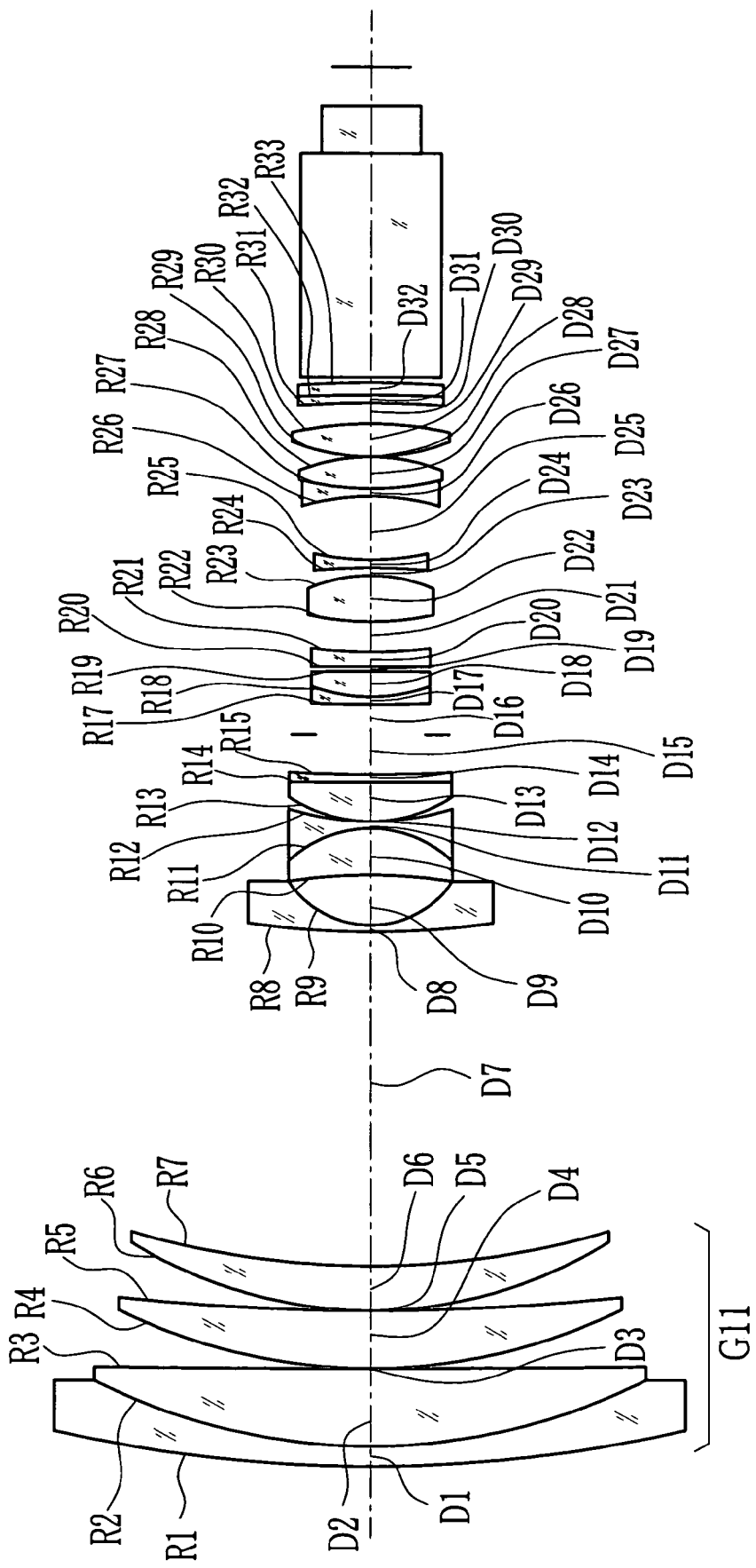
FIG. 5 is section view of the second embodiment set to a telephoto end.

In FIGS. 4 and 5, a vibration-proof zoom lens 2 comprises first through fifth lens groups G11 through G15. The first lens group G11 is composed of a meniscus negative lens 11, a biconvex positive lens 12 joined to the negative lens 11, and meniscus positive lenses 13 and 14. A concave of the negative lens 11 faces toward an image side of the zoom lens 2. A convex of the respective positive lenses 13 and 14 faces toward a subject side of the zoom lens 2. The second lens group G12 is composed of a meniscus negative lens 21, a meniscus positive lens 22, a biconcave negative lens 23 joined to the positive lens 22, a meniscus positive lens 24, and a meniscus negative lens 25 joined to the positive lens 24. A concave of the negative lens 21 faces toward the image side. A convex of the positive lens 22 faces toward the image side. A convex of the positive lens 24 faces toward the subject side. A concave of the negative lens 25 faces toward the image side.

The third lens group G13 is composed of a meniscus negative lens 31, a meniscus positive lens 32, a meniscus negative lens 33, a biconvex positive lens 34, and a biconcave negative lens 35. A concave of the negative lens 31 faces toward the image side. A convex of the positive lens 32 faces toward the subject side. The negative lens 33 has an aspherical surface facing toward the subject side and a concave facing toward the image side. To be precise, the third lens group G13 is composed of three subgroups G13a, G13b and G13c. The first subgroup G13a is a cemented lens of the negative lens 31 and the positive lens 32. The second subgroup G13b comprises the negative lens 33 and the positive lens 34. The third subgroup G13c comprises the negative lens 35. The second subgroup G13b moves in a direction perpendicular to the optical axis to prevent an image blur from being caused due to vibration. A distance d extending between the concave of the negative lens 33, which faces toward the image side, and the convex of the positive lens 34, which faces toward the subject side, is longest in the third lens group G13. When the entire length of the second subgroup G13b in the optical-axis direction is represented by L, d/L is as follows.

$$d/L = 0.537/1.636 = 0.3282$$

Figure 6A:
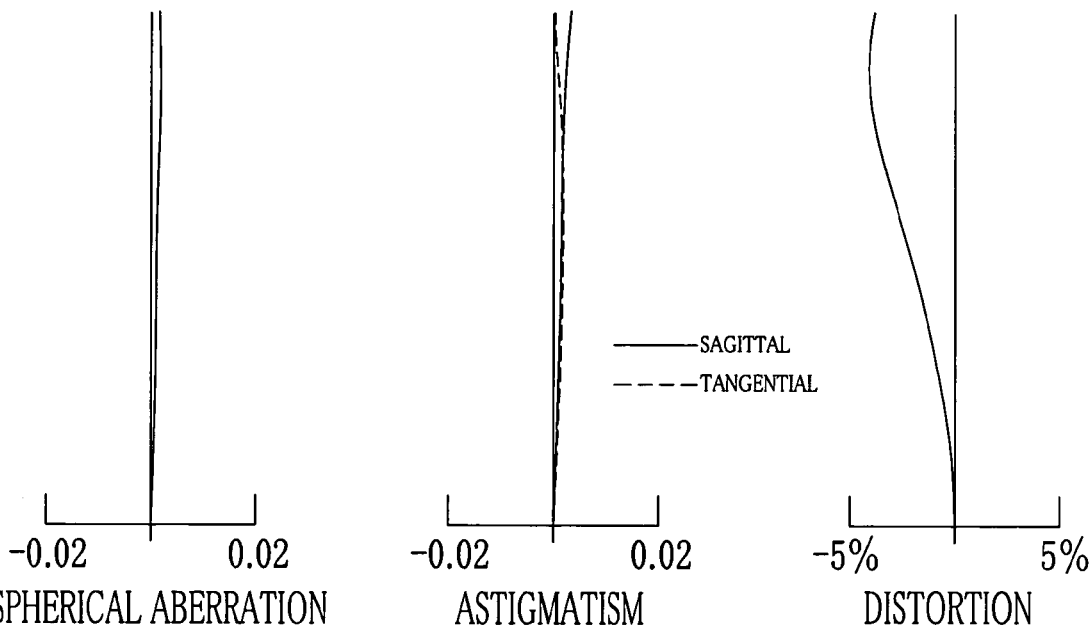
FIGS. 6A and 6B are charts showing aberration of the wide-angle and telephoto ends of the second embodiment.
Figure 6B:
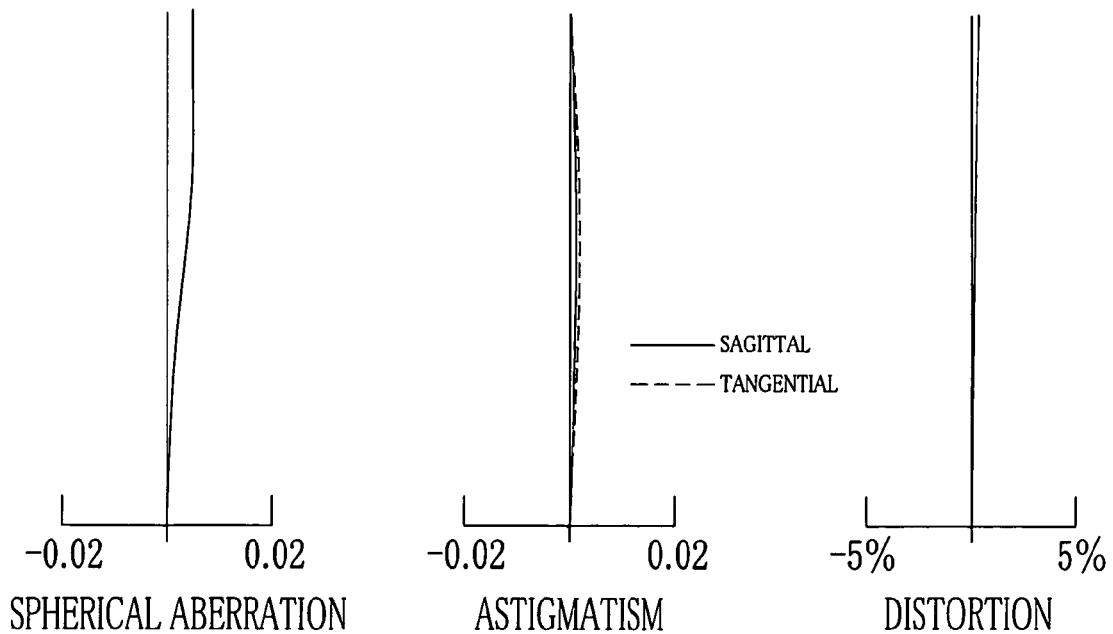

The fourth lens group G14 is composed of a biconcave negative lens 41, a biconvex positive lens 42 joined to the negative lens 41, and a biconvex positive lens 43 having an aspherical surface facing toward the subject side. The fifth lens group G15 is composed of a meniscus negative lens 51 and a meniscus positive lens 52 joined to the negative lens 51. A concave of the negative lens 51 faces toward the subject side and has high power. A convex of the positive lens 52 faces toward the image side and has high power. With respect to the aspherical surface (twentieth surface) of the negative lens 33 and the aspherical surface (twenty-ninth surface) of the positive lens 43, aspherical surface coefficients thereof are shown in the following Table 5. Composite focal length and f-number change in accordance with movement proceeding from the wide-angle end to the telephoto end. Anteroposterior lens intervals of each of the second and fourth lens groups G12 and G14 also change in accordance with the movement proceeding from the wide-angle end to the telephoto end. These changes are shown in the following Table 6. Meanwhile, FIGS. 6A and 6B are charts showing aberration concerning the wide-angle end and the telephoto end of the vibration-proof zoom lens 2.

TABLE 5

|  | 20th Surface | 29th Surface |
|---|---|---|
| K | −4.760976847E+03 | 3.361762111E−01 |
| B3 | 1.926425693E−04 | −1.894029014E−04 |
| B4 | −9.403141148E−03 | −3.108275312E−03 |
| B5 | −1.819658098E−03 | −4.286976418E−04 |
| B6 | 1.591960279E−03 | 1.101766684E−04 |
| B7 | −2.492869528E−04 | 8.494042902E−05 |
| B8 | −3.159250947E−03 | 1.864956378E−05 |
| B9 | −1.000678511E−03 | −6.229156424E−06 |
| B10 | 1.309205932E−03 | −1.051164311E−05 |
| B11 | −4.894710944E−04 | −9.790889052E−06 |
| B12 | 3.188348085E−03 | −5.473045947E−06 |
| B13 | 5.130459406E−04 | −6.131882196E−06 |
| B14 | −1.169084369E−03 | −2.956259640E−06 |
| B15 | −3.881281780E−03 | −2.152928510E−06 |
| B16 | 2.233433739E−03 | 1.949483487E−06 |
| B17 | −1.449095307E−04 | 2.736684446E−06 |
| B18 | 2.555550014E−03 | 4.175378973E−06 |
| B19 | −3.020285959E−03 | 1.225204411E−06 |
| B20 | 1.021712323E−03 | −2.691358606E−06 |

TABLE 6

| F | 1.00 | 4.00 | 11.40 |
|---|---|---|---|
| f-number | 1.96 | 2.30 | 2.85 |
| D7 | 0.167 | 4.299 | 6.094 |
| D15 | 6.553 | 2.422 | 0.627 |
| D25 | 1.356 | 0.670 | 1.155 |
| D30 | 0.167 | 0.853 | 0.368 |

Embodiment 3

TABLE 7A

|  | Curvature Radius R | Surface Interval D | Refractive Index Ne | Abbe Number ν d |
|---|---|---|---|---|
| 1 | 24.0369 | 0.335 | 1.855037 | 23.8 |
| 2 | 10.4204 | 1.465 | 1.498457 | 81.6 |

TABLE 7A-continued

| | Curvature Radius R | Surface Interval D | Refractive Index Ne | Abbe Number ν d |
|---|---|---|---|---|
| 3 | −422.8134 | 0.017 | | |
| 4 | 10.2882 | 1.024 | 1.659556 | 58.7 |
| 5 | 44.7065 | 0.017 | | |
| 6 | 8.0649 | 0.851 | 1.694946 | 56.9 |
| 7 | 18.0344 | Variable | | |
| 8 | 22.5358 | 0.134 | 1.888140 | 40.8 |
| 9 | 1.7927 | 0.902 | | |
| 10 | −7.0581 | 0.667 | 1.858889 | 22.5 |
| 11 | −2.3829 | 0.136 | 1.766465 | 51.7 |
| 12 | 4.7526 | 0.017 | | |
| 13 | 3.0233 | 0.657 | 1.597093 | 38.7 |
| 14 | −565.4821 | 0.136 | 1.885110 | 40.0 |
| 15 | 33.2075 | Variable | | |
| 16 | Stop | 0.549 | | |
| 17 | 5.7243 | 0.134 | 1.798233 | 45.3 |
| 18 | 2.6118 | 0.463 | 1.858480 | 22.5 |
| 19 | 20.1018 | 0.167 | | |
| *20 | 18892.9156 | 0.258 | 1.694165 | 31.1 |
| 21 | 8.7467 | 0.500 | | |
| 22 | 4.8554 | 0.548 | 1.497854 | 65.2 |
| 23 | −2.9034 | 0.119 | | |
| 24 | −16.8593 | 0.134 | 1.858730 | 22.5 |
| 25 | 4.4350 | Variable | | |
| 26 | −2.5846 | 0.134 | 1.616282 | 38.0 |
| 27 | 6.3842 | 0.633 | 1.500416 | 65.1 |
| 28 | −2.5911 | 0.017 | | |

TABLE 7B

| | Curvature Radius R | Surface Interval D | Refractive Index Ne | Abbe Number ν d |
|---|---|---|---|---|
| *29 | 3.7481 | 0.603 | 1.639315 | 59.7 |
| 30 | −6.3195 | Variable | | |
| 31 | −12.2265 | 0.134 | 1.854952 | 23.9 |
| 32 | −21.7048 | 0.204 | 1.888140 | 40.8 |
| 33 | −11.4395 | 0.084 | | |
| 34 | Infinity | 4.017 | 1.607181 | 38.0 |
| 35 | Infinity | 0.845 | 1.518250 | 64.1 |
| 36 | Infinity | | | |

In FIGS. 7 and 8, a vibration-proof zoom lens 3 comprises first through fifth lens groups G11 through G15. The first lens group G11 is composed of a meniscus negative lens 11, a biconvex positive lens 12 joined to the negative lens 11, and meniscus positive lenses 13 and 14. A concave of the negative lens 11 faces toward an image side of the zoom lens 3. A convex of the respective positive lenses 13 and 14 faces toward a subject side of the zoom lens 3. The second lens group G12 is composed of a meniscus negative lens 21, a meniscus positive lens 22, a biconcave negative lens 23 joined to the positive lens 22, a biconvex positive lens 24, and a biconcave negative lens 25 joined to the positive lens 24. A concave of the negative lens 21 faces toward the image side. A convex of the positive lens 22 faces toward the image side.

The third lens group G13 is composed of a meniscus negative lens 31, a meniscus positive lens 32, a meniscus negative lens 33, a biconvex positive lens 34, and a biconcave negative lens 35. A concave of the negative lens 31 faces toward the image side. A convex of the positive lens 32 faces toward the subject side. The negative lens 33 has an aspherical surface facing toward the subject side and has a concave facing toward the image side. To be precise, the third lens group G13 is composed of three subgroups G13a, G13b and G13c. The first subgroup G13a is a cemented lens of the negative lens 31 and the positive lens 32. The second subgroup G13b comprises the negative lens 33 and the positive lens 34. The third subgroup G13c comprises the negative lens 35. The second subgroup G13b moves in a direction perpendicular to the optical axis to prevent an image blur from being caused due to vibration. A distance d extending between the concave of the negative lens 33, which faces toward the image side, and the convex of the positive lens 34, which faces toward the subject side, is longest in the third lens group G13. When the entire length of the second subgroup G13b in the optical-axis direction is represented by L, d/L is as follows.

$$d/L = 0.500/1.306 = 0.3828$$

Figure 9A:
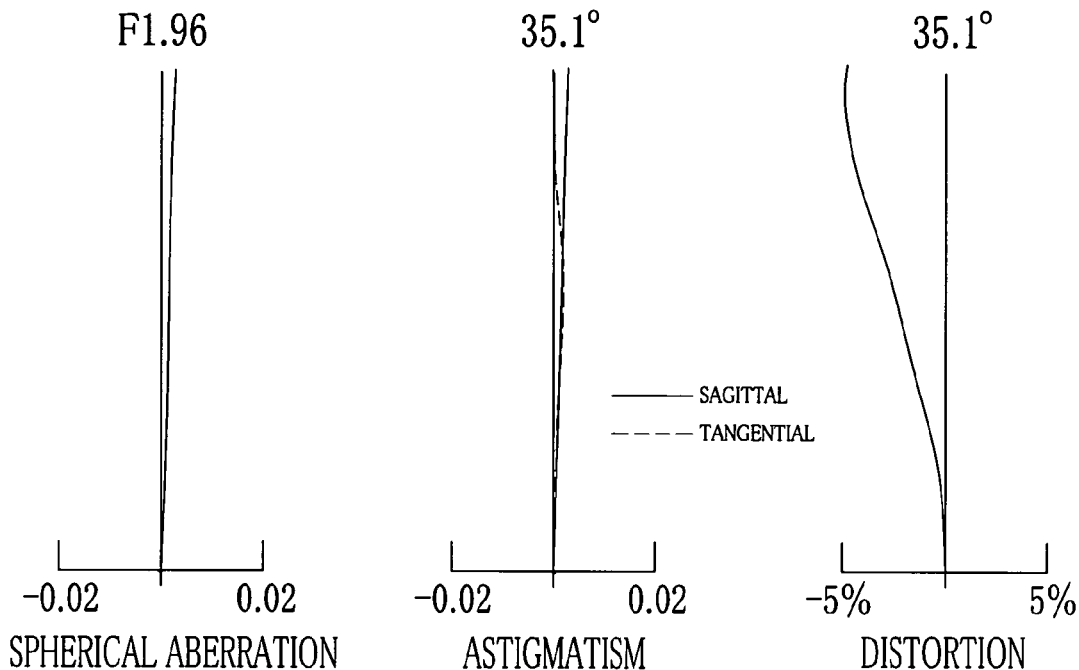
FIGS. 9A and 9B are charts showing aberration of the wide-angle and telephoto ends of the third embodiment.
Figure 9B:
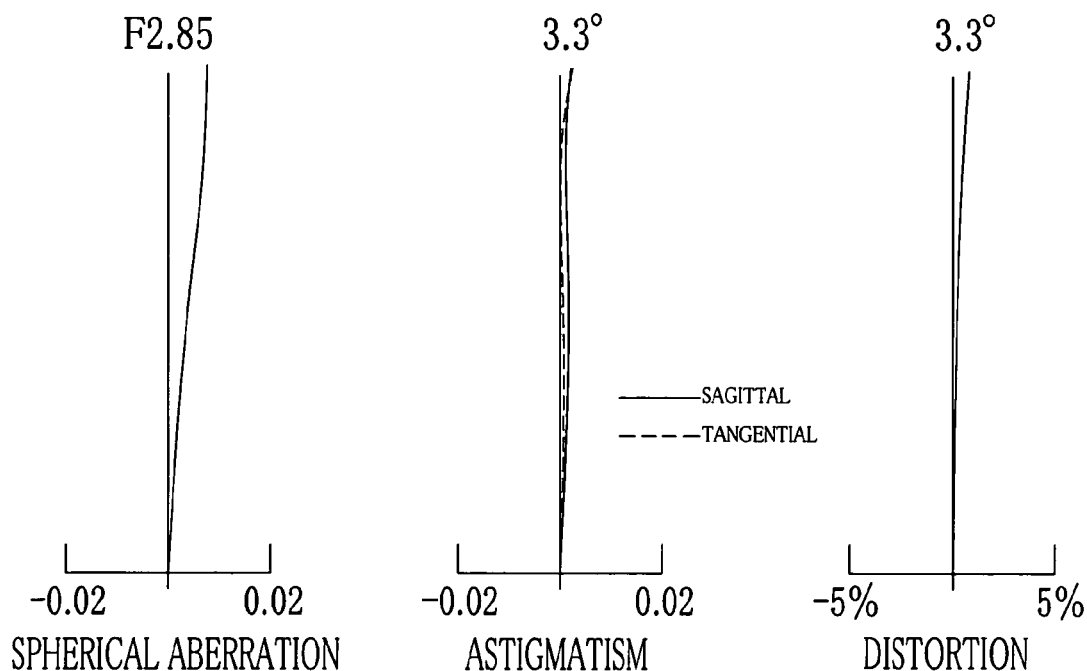

The fourth lens group G14 is composed of a biconcave negative lens 41, a biconvex positive lens 42 joined to the negative lens 41, and a biconvex positive lens 43 having an aspherical surface facing toward the subject side. The fifth lens group G15 is composed of a meniscus negative lens 51 and a meniscus positive lens 52 joined to the negative lens 51. A concave of the negative lens 51 faces toward the subject side and has high power. A convex of the positive lens 52 faces toward the image side and has high power. With respect to the aspherical surface (twentieth surface) of the negative lens 33 and the aspherical surface (twenty-ninth surface) of the positive lens 43, aspherical surface coefficients thereof are shown in the following Table 7. Composite focal length and f-number change in accordance with movement proceeding from the wide-angle end to the telephoto end. Anteroposterior lens intervals of each of the second and fourth lens groups G12 and G14 also change in accordance with the movement proceeding from the wide-angle end to the telephoto end. These changes are shown in the following Table 9. Meanwhile, FIGS. 9A and 9B are charts showing aberration concerning the wide-angle end and the telephoto end of the vibration-proof zoom lens 3.

TABLE 8

| | 20th Surface | 29th Surface |
|---|---|---|
| K | 3.357986651E+05 | 3.813990048E−01 |
| B3 | 7.874170801E−06 | −2.190719798E−04 |
| B4 | −1.064745673E−02 | −2.957542372E−03 |
| B5 | −2.774428911E−03 | −3.051085888E−04 |
| B6 | 1.812377568E−03 | 1.229349757E−04 |
| B7 | 4.759107557E−04 | 4.791551624E−05 |
| B8 | −2.580608035E−03 | −1.636146624E−05 |
| B9 | −8.402524262E−04 | −1.929226381E−05 |
| B10 | 9.839300185E−04 | −6.547370582E−06 |
| B11 | −7.324262494E−04 | −1.522303363E−06 |
| B12 | 2.356602459E−03 | 5.283315209E−06 |
| B13 | 1.532855930E−03 | 4.898852341E−07 |
| B14 | −1.383373294E−03 | −9.630407358E−07 |
| B15 | −4.020855944E−03 | −3.526965235E−06 |
| B16 | 2.132614393E−03 | −8.424492032E−07 |
| B17 | −2.857024648E−04 | −5.721118862E−08 |
| B18 | 2.658955619E−03 | 2.500804666E−06 |
| B19 | −2.543405426E−03 | 1.100279069E−06 |
| B20 | 7.360485705E−04 | −1.207419808E−06 |

TABLE 9

| F | 1.00 | 4.00 | 11.40 |
|---|---|---|---|
| f-number | 1.96 | 2.30 | 2.85 |
| D7 | 0.167 | 4.384 | 6.133 |
| D15 | 6.515 | 2.299 | 0.549 |
| D25 | 1.648 | 0.957 | 1.369 |
| D30 | 0.167 | 0.858 | 0.447 |

Embodiment 4

TABLE 10A

| | Curvature Radius R | Surface Interval D | Refractive Index Ne | Abbe Number ν d |
|---|---|---|---|---|
| 1 | 22.2350 | 0.335 | 1.855037 | 23.8 |
| 2 | 10.1399 | 1.473 | 1.498457 | 81.6 |
| 3 | 557.6586 | 0.017 | | |
| 4 | 10.6029 | 0.968 | 1.663711 | 58.4 |
| 5 | 38.4323 | 0.017 | | |
| 6 | 8.1635 | 0.878 | 1.690561 | 57.1 |
| 7 | 20.2193 | Variable | | |
| 8 | 19.2225 | 0.134 | 1.888140 | 40.8 |
| 9 | 1.8148 | 0.943 | | |
| 10 | −7.7011 | 0.619 | 1.858890 | 22.5 |
| 11 | −2.7643 | 0.136 | 1.757649 | 52.6 |
| 12 | 4.7078 | 0.017 | | |
| 13 | 3.0440 | 0.647 | 1.664178 | 32.9 |
| 14 | 35.3394 | 0.134 | 1.885089 | 40.0 |
| 15 | 16.2065 | Variable | | |
| 16 | Stop | 0.591 | | |
| 17 | 4.1700 | 0.134 | 1.882643 | 38.7 |
| 18 | 2.4166 | 0.439 | 1.858795 | 22.5 |
| 19 | 9.1742 | 0.167 | | |
| *20 | −153.5914 | 0.260 | 1.694165 | 31.1 |
| 21 | 8.8341 | 0.526 | | |
| 22 | 4.7972 | 0.549 | 1.492018 | 65.4 |
| 23 | −2.8623 | 0.133 | | |
| 24 | −11.9747 | 0.134 | 1.711685 | 29.7 |
| 25 | 3.6483 | Variable | | |
| 26 | −3.1360 | 0.134 | 1.673818 | 32.9 |
| 27 | 4.8311 | 0.656 | 1.569635 | 62.4 |

TABLE 10B

| | Curvature Radius R | Surface Interval D | Refractive Index Ne | Abbe Number ν d |
|---|---|---|---|---|
| 28 | −3.0312 | 0.017 | | |
| *29 | 3.4644 | 0.674 | 1.609710 | 60.9 |
| 30 | −6.2464 | Variable | | |
| 31 | 130.2962 | 0.181 | 1.489148 | 70.2 |
| 32 | −143.1984 | 0.084 | | |
| 33 | Infinity | 4.017 | 1.607181 | 38.0 |
| 34 | Infinity | 0.845 | 1.518250 | 64.1 |
| 35 | Infinity | | | |

Figure 11:
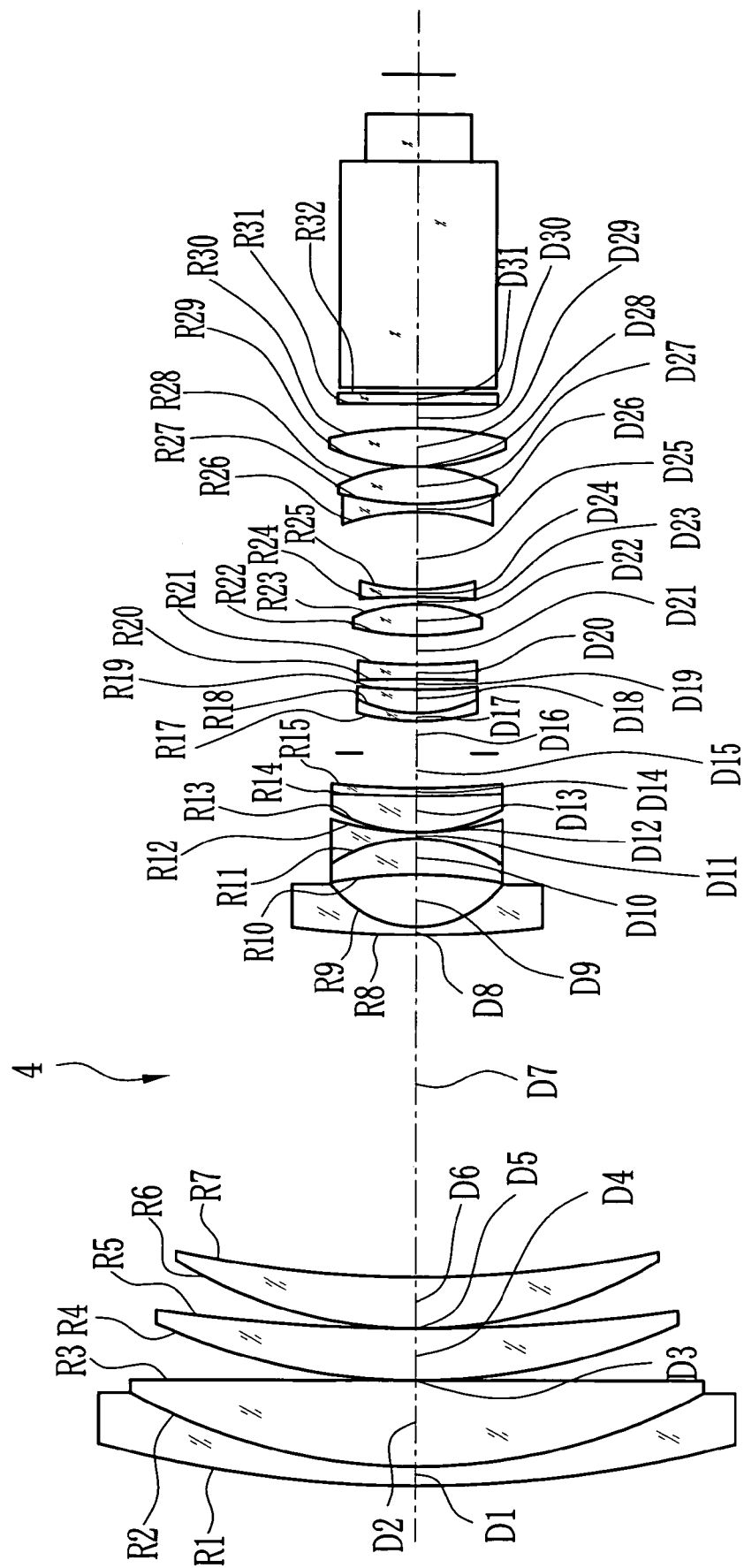
FIG. 11 is a section view of the fourth embodiment set to a telephoto end.

In FIGS. 10 and 11, a vibration-proof zoom lens 4 comprises first through fifth lens groups G11 through G15. The first lens group G11 is composed of a meniscus negative lens 11, a biconvex positive lens 12 joined to the negative lens 11, and meniscus positive lenses 13 and 14. A concave of the negative lens 11 faces toward an image side of the zoom lens 4. A convex of the respective positive lenses 13 and 14 faces toward a subject side of the zoom lens 4. The second lens group G12 is composed of a meniscus negative lens 21, a meniscus positive lens 22, a biconcave negative lens 23 joined to the positive lens 22, a biconvex positive lens 24, and a meniscus negative lens 25 joined to the positive lens 24. A concave of the negative lens 21 faces toward the image side. A convex of the positive lens 22 faces toward the image side. A concave of the negative lens 25 faces toward the image side.

The third lens group G13 is composed of a meniscus negative lens 31, a meniscus positive lens 32, a biconcave negative lens 33, a biconvex positive lens 34, and a biconcave negative lens 35. A concave of the negative lens 31 faces toward the image side. A convex of the positive lens 32 faces toward the subject side. The negative lens 33 has an aspherical surface facing toward the subject side. To be precise, the third lens group G13 is composed of three subgroups G13a, G13b and G13c. The first subgroup G13a is a cemented lens of the negative lens 31 and the positive lens 32. The second subgroup G13b comprises the negative lens 33 and the positive lens 34. The third subgroup G13c comprises the negative lens 35. The second subgroup G13b moves in a direction perpendicular to the optical axis to prevent an image blur from being caused due to vibration. A distance d extending between the concave of the negative lens 33, which faces toward the image side, and the convex of the positive lens 34, which faces toward the subject side, is longest in the third lens group G13. When the entire length of the second subgroup G13b in the optical-axis direction is represented by L, d/L is as follows.

$$d/L = 0.526/1.335 = 0.3940$$

Figure 12A:
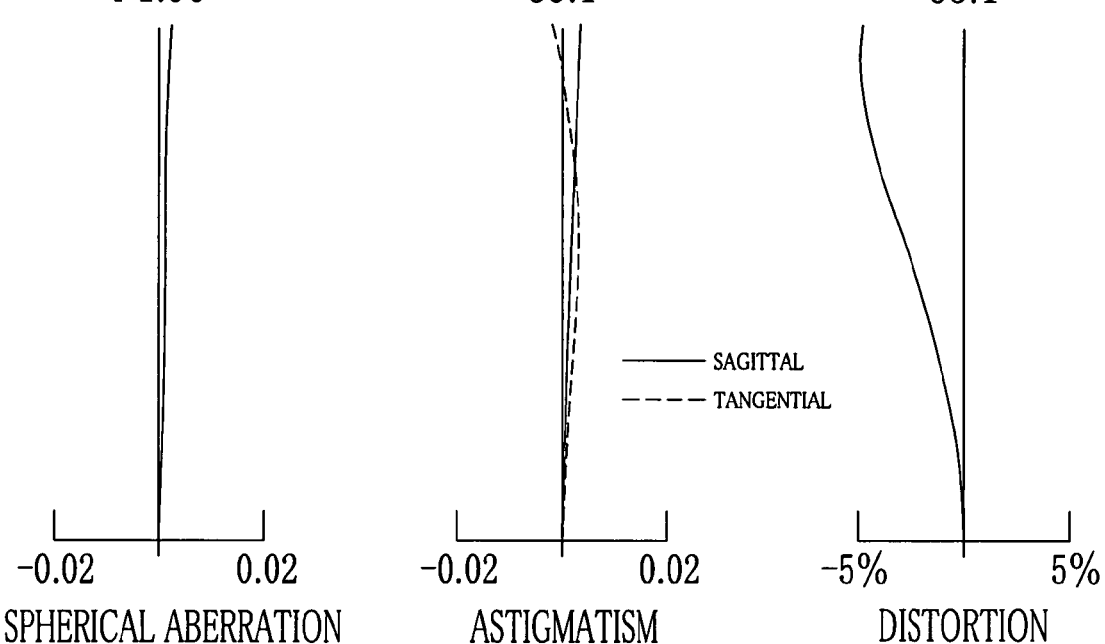
FIGS. 12A and 12B are charts showing aberration of the wide-angle and telephoto ends of the fourth embodiment.
Figure 12B:
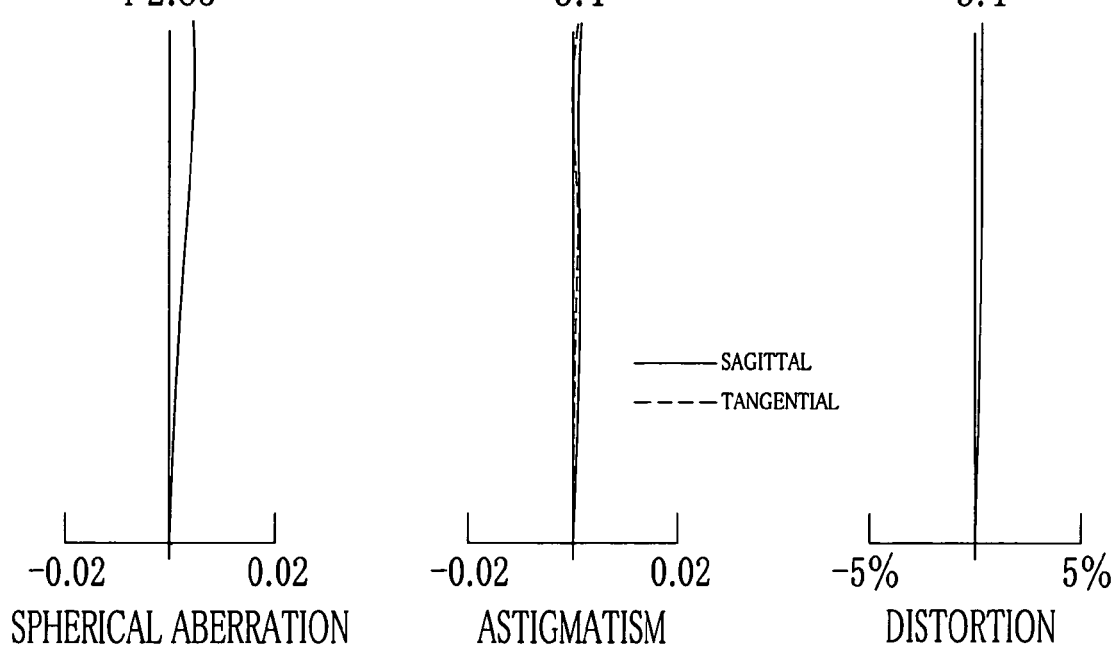

The fourth lens group G14 is composed of a biconcave negative lens 41, a biconvex positive lens 42 joined to the negative lens 41, and a biconvex positive lens 43 having an aspherical surface facing toward the subject side. The fifth lens group G15 is composed of a biconvex positive lens 50, the subject-side convex of which has slightly-high power. With respect to the aspherical surface (twentieth surface) of the negative lens 33 and the aspherical surface (twenty-ninth surface) of the positive lens 43, aspherical surface coefficients thereof are shown in the following Table 11. Composite focal length and f-number change in accordance with movement proceeding from the wide-angle end to the telephoto end. Anteroposterior lens intervals of each of the second and fourth lens groups G12 and G14 also change in accordance with the movement proceeding from the wide-angle end to the telephoto end. These changes are shown in the following Table 12. Meanwhile, FIGS. 12A and 12B are charts showing aberration concerning the wide-angle end and the telephoto end of the vibration-proof zoom lens 4.

TABLE 11

| | 20th Surface | 29th Surface |
|---|---|---|
| K | 1.726814595E+04 | 3.843827578E−01 |
| B3 | −4.061735325E−04 | 1.965877545E−05 |
| B4 | −9.214105706E−03 | −3.099321775E−03 |
| B5 | −4.506581303E−03 | −2.149345357E−04 |
| B6 | 1.582739968E−03 | 1.628919914E−04 |
| B7 | 1.895959420E−03 | 5.316147538E−05 |
| B8 | −1.372069322E−03 | −2.444344034E−05 |
| B9 | −1.069468808E−03 | −2.642774403E−05 |
| B10 | −1.044528509E−03 | −1.019262688E−05 |
| B11 | −2.628451665E−03 | 3.832513267E−07 |
| B12 | 2.279315901E−03 | 6.028876096E−06 |
| B13 | 7.307961940E−03 | 1.257447078E−06 |
| B14 | −1.324720969E−03 | −2.977452708E−07 |
| B15 | −4.478487558E−03 | −3.363492773E−06 |
| B16 | −1.511264196E−03 | −1.107256457E−06 |
| B17 | −2.049640394E−03 | −4.188577019E−07 |
| B18 | 9.345751027E−04 | 2.189513074E−06 |
| B19 | 6.352979467E−03 | 1.052363446E−06 |
| B20 | −3.537264569E−03 | −9.750325286E−07 |

TABLE 12

| F | 1.00 | 4.00 | 11.40 |
|---|---|---|---|
| f-number | 1.96 | 2.30 | 2.85 |
| D7 | 0.167 | 4.425 | 6.236 |
| D15 | 6.572 | 2.313 | 0.502 |
| D25 | 1.633 | 0.952 | 1.415 |
| D30 | 0.167 | 0.849 | 0.386 |

Embodiment 5

TABLE 13A

|  | Curvature Radius R | Surface Interval D | Refractive Index Ne | Abbe Number ν d |
|---|---|---|---|---|
| 1 | 21.9898 | 0.335 | 1.855037 | 23.8 |
| 2 | 9.7536 | 1.484 | 1.498457 | 81.6 |
| 3 | 243.7766 | 0.017 | | |
| 4 | 10.4555 | 0.964 | 1.699791 | 55.5 |
| 5 | 37.0866 | 0.017 | | |
| 6 | 8.2253 | 0.842 | 1.699791 | 55.5 |
| 7 | 20.1932 | Variable | | |
| 8 | 17.6492 | 0.134 | 1.888140 | 40.8 |
| 9 | 1.7927 | 0.947 | | |
| 10 | −7.7373 | 0.562 | 1.854952 | 23.9 |
| 11 | −2.8386 | 0.136 | 1.758439 | 52.3 |
| 12 | 4.6170 | 0.017 | | |
| 13 | 3.0644 | 0.630 | 1.723103 | 29.5 |
| 14 | 24.6635 | 0.134 | 1.888140 | 40.8 |
| 15 | 13.4103 | Variable | | |
| 16 | Stop | 0.721 | | |
| 17 | 4.3107 | 0.134 | 1.888140 | 40.8 |
| 18 | 2.1569 | 0.487 | 1.854952 | 23.9 |
| 19 | 10.3034 | 0.238 | | |
| *20 | −16.0290 | 0.201 | 1.694165 | 31.1 |
| 21 | 24.0729 | 0.336 | | |
| 22 | 4.6579 | 0.618 | 1.489148 | 70.2 |
| 23 | −2.9669 | 0.124 | | |
| 24 | −14.7767 | 0.134 | 1.761680 | 27.5 |
| 25 | 3.7138 | Variable | | |
| 26 | −2.8760 | 0.134 | 1.671578 | 33.0 |
| 27 | 5.0645 | 0.722 | 1.566053 | 60.7 |
| 28 | −2.8098 | 0.017 | | |

TABLE 13B

|  | Curvature Radius R | Surface Interval D | Refractive Index Ne | Abbe Number ν d |
|---|---|---|---|---|
| *29 | 3.3922 | 0.682 | 1.591424 | 61.2 |
| 30 | −6.2703 | Variable | | |
| 31 | Infinity | 0.182 | 1.489148 | 70.2 |
| 32 | −68.2326 | 0.084 | | |
| 33 | Infinity | 4.017 | 1.607181 | 38.0 |
| 34 | Infinity | 0.845 | 1.518250 | 64.1 |
| 35 | Infinity | | | |

Figure 13:
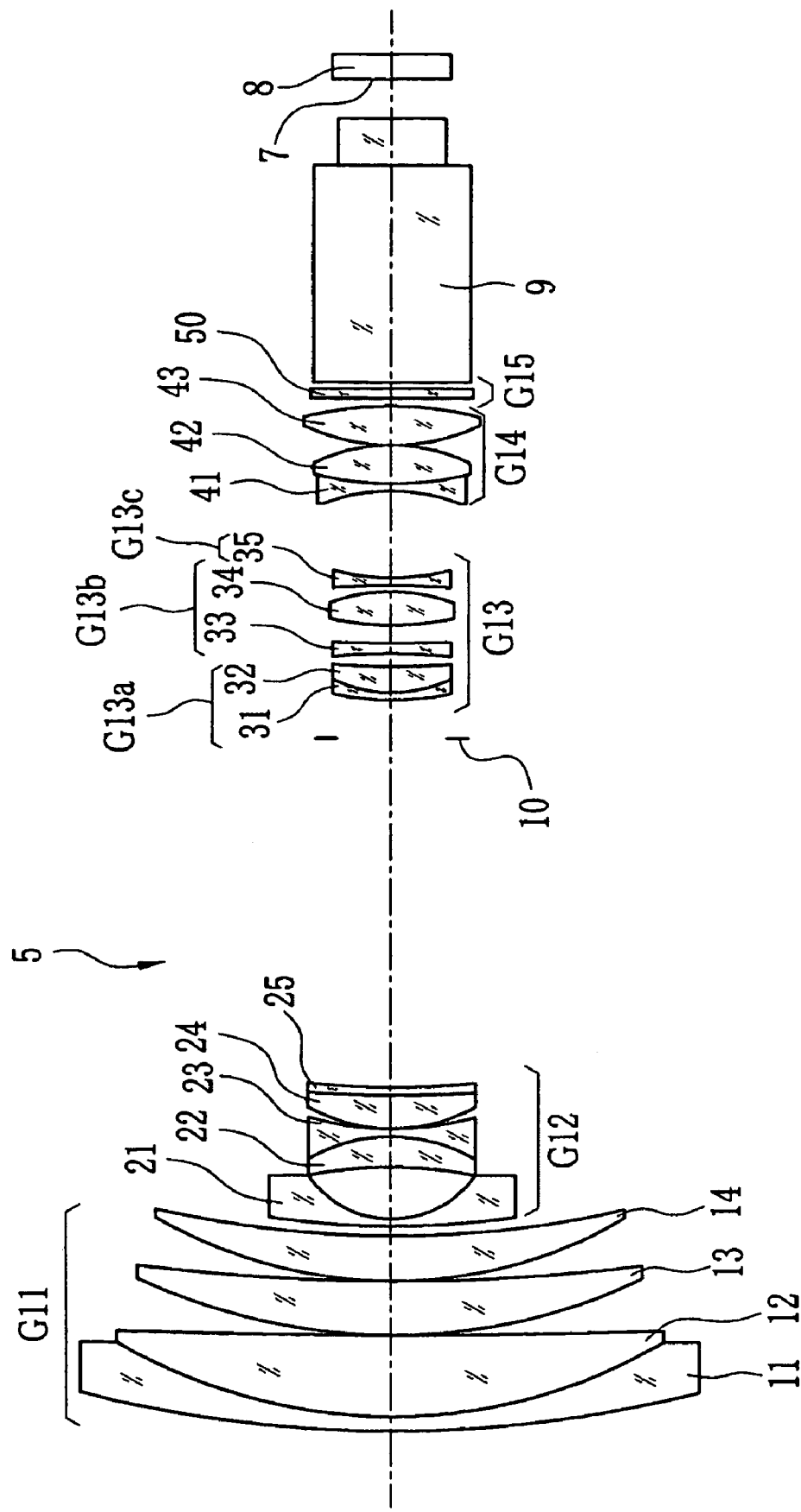
FIG. 13 is a section view of a fifth embodiment set to a wide-angle end.
Figure 14:
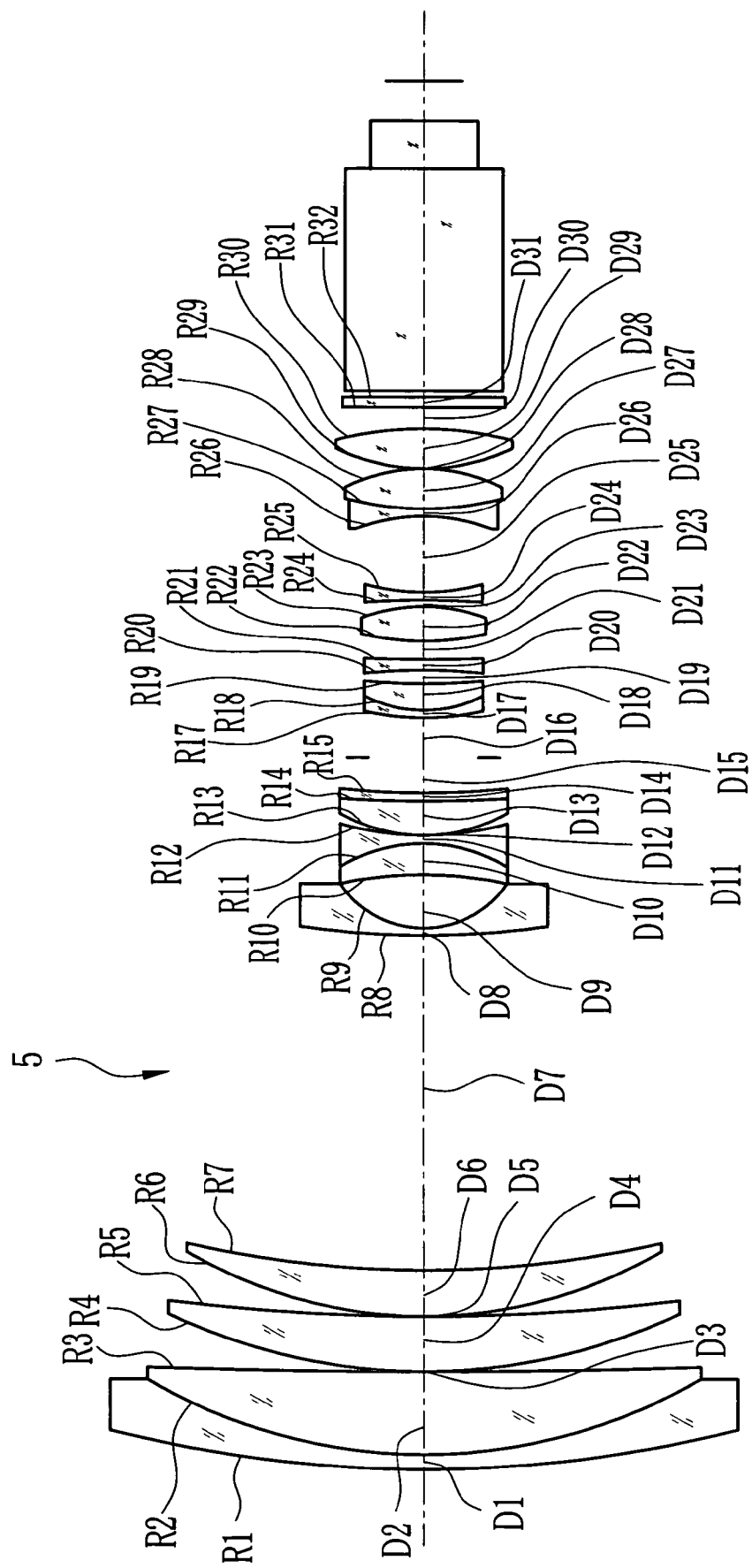
FIG. 14 is a section view of the fifth embodiment set to a telephoto end.

In FIGS. 13 and 14, a vibration-proof zoom lens 5 comprises first through fifth lens groups G11 through G15. The first lens group G11 is composed of a meniscus negative lens 11, a biconvex positive lens 12 joined to the negative lens 11, and meniscus positive lenses 13 and 14. A concave of the negative lens 11 faces toward an image side of the zoom lens 5. A convex of the respective positive lenses 13 and 14 faces toward a subject side of the zoom lens 5. The second lens group G12 is composed of a meniscus negative lens 21, a meniscus positive lens 22, a biconcave negative lens 23 joined to the positive lens 22, a meniscus positive lens 24, and a meniscus negative lens 25 joined to the positive lens 24. A concave of the negative lens 21 faces toward the image side. A convex of the positive lens 22 faces toward the image side. A convex of the positive lens 24 faces toward the subject side.

The third lens group G13 is composed of a meniscus negative lens 31, a meniscus positive lens 32 joined to the negative lens 31, a biconcave negative lens 33, a biconvex positive lens 34, and a biconcave negative lens 35. A concave of the negative lens 31 faces toward the image side. The negative lens 33 has an aspherical surface facing toward the subject side. To be precise, the third lens group G13 is composed of three subgroups G13a, G13b and G13c. The first subgroup G13a is a cemented lens of the negative lens 31 and the positive lens 32. The second subgroup G13b comprises the negative lens 33 and the positive lens 34. The third subgroup G13c comprises the negative lens 35. The second subgroup G13b moves in a direction perpendicular to the optical axis to prevent an image blur from being caused due to vibration. A distance d extending between the concave of the negative lens 33, which faces toward the image side, and the convex of the positive lens 34, which faces toward the subject side, is longest in the third lens group G13. When the entire length of the second subgroup G13b in the optical-axis direction is represented by L, d/L is as follows.

$d/L = 0.336/1.155 = 0.2909$

Figure 15A:
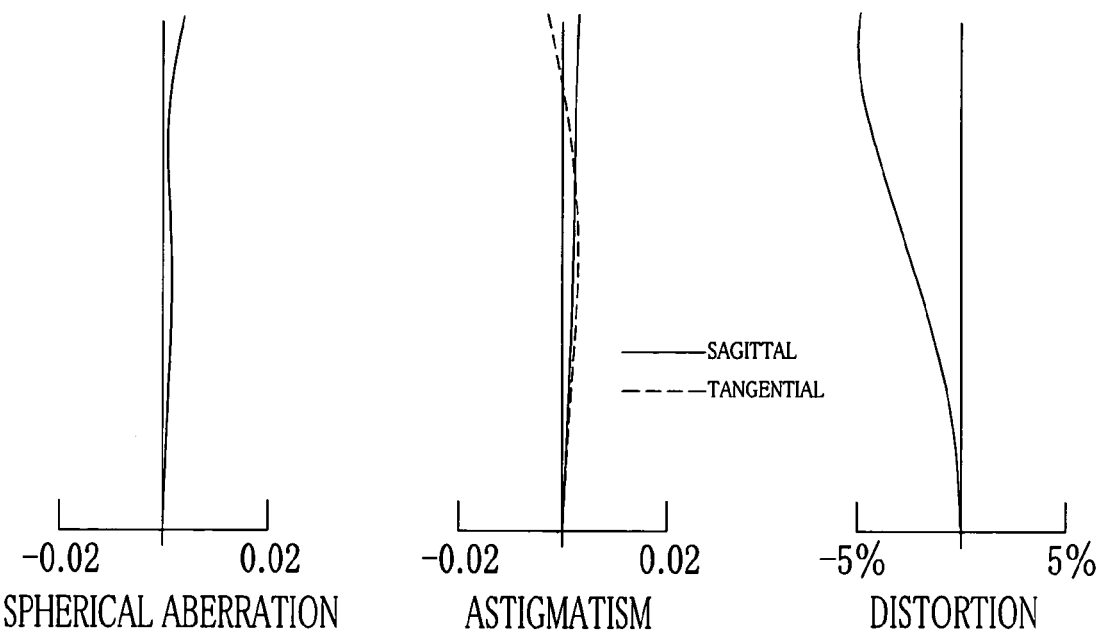
FIGS. 15A and 15B are charts showing aberration of the wide-angle and telephoto ends of the fifth embodiment.
Figure 15B:
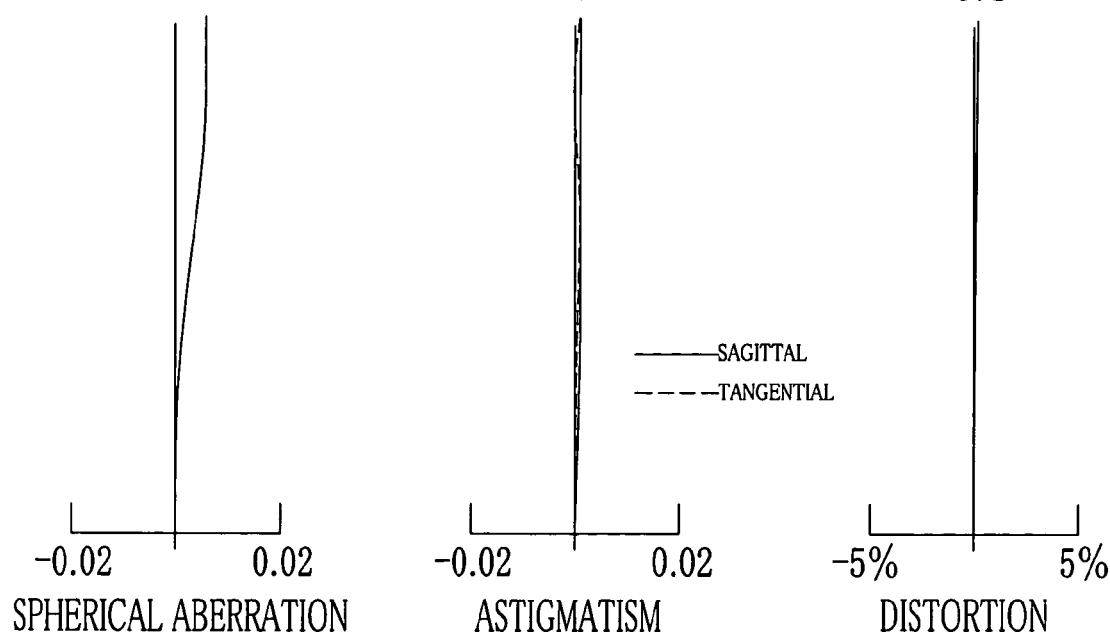

The fourth lens group G14 is composed of a biconcave negative lens 41, a biconvex positive lens 42 joined to the negative lens 41, and a biconvex positive lens 43 having an aspherical surface facing toward the subject side. The fifth lens group G15 is composed of a planoconvex positive lens 50 having a plane facing toward the subject side. With respect to the aspherical surface (twentieth surface) of the negative lens 33 and the aspherical surface (twenty-ninth surface) of the positive lens 43, aspherical surface coefficients thereof are shown in the following Table 14. Composite focal length and f-number change in accordance with movement proceeding from the wide-angle end to the telephoto end. Anteroposterior lens intervals of each of the second and fourth lens groups G12 and G14 also change in accordance with the movement proceeding from the wide-angle end to the telephoto end. These changes are shown in the following Table 15. Meanwhile, FIGS. 15A and 15B are charts showing aberration concerning the wide-angle end and the telephoto end of the vibration-proof zoom lens 5.

TABLE 14

|  | 20th Surface | 29th Surface |
|---|---|---|
| K | 1.000000015E+02 | 3.264443348E−01 |
| B3 | −1.871059678E−03 | 2.773912798E−04 |
| B4 | 1.372236339E−03 | −3.322460636E−03 |
| B5 | −1.638820804E−02 | −1.010818101E−04 |
| B6 | 1.147055636E−03 | 1.876127496E−04 |
| B7 | 1.092549627E−02 | 6.090268148E−05 |
| B8 | 1.754725338E−02 | −2.196702033E−05 |
| B9 | −2.858731182E−02 | −3.482981513E−05 |
| B10 | −4.037575468E−03 | −1.180171046E−05 |
| B11 | −1.103916026E−02 | −1.852120291E−06 |
| B12 | −1.262796147E−02 | 2.041350982E−06 |
| B13 | 3.273537948E−02 | 5.683561901E−06 |
| B14 | −3.454100480E−02 | −6.494127411E−07 |
| B15 | 1.307668324E−03 | −1.014048011E−06 |
| B16 | 3.714384098E−02 | −1.425061993E−06 |
| B17 | −2.668579214E−02 | −6.418766684E−07 |
| B18 | 2.191900021E−02 | 1.874535311E−06 |
| B19 | −4.028022523E−02 | 3.080128275E−07 |
| B20 | 2.083792755E−02 | −5.048086583E−07 |

TABLE 15

| F | 1.00 | 4.00 | 11.40 |
|---|---|---|---|
| f-number | 1.96 | 2.30 | 2.85 |
| D7 | 0.167 | 4.419 | 6.212 |
| D15 | 6.547 | 2.296 | 0.502 |
| D25 | 1.623 | 0.948 | 1.417 |
| D30 | 0.167 | 0.843 | 0.374 |

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A vibration-proof zoom lens for preventing deviation of an image of a subject when vibration of camera occurs, said image of the subject being formed on an image plane, said zoom lens comprising:
   a positive first lens group fixed at a side of said subject;
   a negative second lens group disposed between said first lens group and said image plane so as to be movable along an optical axis of said zoom lens, said second lens group moving toward said image plane to change a magnification from a wide-angle end to a telephoto end;
   a positive third lens group disposed between said second lens group and said image plane, said third lens group including a first subgroup, a second subgroup and a third subgroup, and said second subgroup being moved in a plane perpendicular to said optical axis to correct a blur of said image at a time of the vibration of said camera;
   a positive fourth lens group disposed between said third lens group and said image plane so as to be movable along said optical axis, said fourth lens group being moved to correct variation of said image plane, which is caused in accordance with a change of the magnification, and to perform focusing; and
   a positive fifth lens group fixed between said fourth lens group and said image plane.

2. The vibration-proof zoom lens according to claim 1, wherein said first and second subgroups are positive lens group as a whole, and said third subgroup is negative lens group as a whole.

3. The vibration-proof zoom lens according to claim 2, wherein said second subgroup includes a negative front group and a positive rear group, which are disposed in this order from the subject, and at least one surface of said negative front group is an aspherical surface.

4. The vibration-proof zoom lens according to claim 3, wherein the surface of said negative front group, which is nearest to the subject, is the aspherical surface of which concave power becomes stronger toward its periphery.

5. The vibration-proof zoom lens according to claim 4, wherein said negative front group and said positive rear group are respectively composed of a single lens.

6. The vibration-proof zoom lens according to claim 3, wherein when L represents the entire length of said second subgroup along said optical axis and d represents a distance extending from the surface of said negative front group, which is nearest to the image, to the surface of the positive rear group, which is nearest to the subject, along said optical axis, the following expression is satisfied:

$$0.25 < d/L < 0.5.$$

7. The vibration-proof zoom lens according to claim 1, wherein said fourth lens group includes a negative lens having a concave facing toward the subject, a positive lens having a convex facing toward the image plane, and a biconvex positive lens, which are disposed in this order from the subject, either surface of said biconvex positive lens being an aspherical surface of which convex power becomes stronger toward its periphery.

8. The vibration-proof zoom lens according to claim 1, wherein said second lens group includes a negative meniscus lens having a concave facing toward the image plane, a cemented lens of a negative lens and a positive lens having a convex facing toward the image plane, a positive lens having a convex facing toward the subject, and a negative lens.

9. The vibration-proof zoom lens according to claim 1, further comprising:
   a color separation member disposed between said fifth lens group and said image plane to separate colors of incident light.

10. The vibration-proof zoom lens according to claim 9, further comprising:
    a stop disposed between said second lens group and said third lens group.

11. A camera comprising:
    a vibration-proof zoom lens according to claim 1; and
    an imaging device for taking a subject image formed through said vibration-proof zoom lens, said imaging device outputting an image signal of the taken subject image.

* * * * *